US012634038B2

(12) United States Patent
Hasegawa et al.

(10) Patent No.: US 12,634,038 B2
(45) Date of Patent: May 19, 2026

(54) METHODS FOR DYNAMIC DATA TRANSMISSIONS IN WIRELESS SYSTEMS

(71) Applicant: INTERDIGITAL PATENT HOLDINGS, INC., Wilmington, DE (US)

(72) Inventors: Fumihiro Hasegawa, Westmount (CA); Paul Marinier, Brossard (CA); Faris Alfarhan, Montreal (CA); Aata El Hamss, Laval (CA); Virgil Comsa, Montreal (CA); Moon Il Lee, Melville, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/284,151

(22) PCT Filed: Mar. 28, 2022

(86) PCT No.: PCT/US2022/022099
§ 371 (c)(1),
(2) Date: Sep. 26, 2023

(87) PCT Pub. No.: WO2022/212234
PCT Pub. Date: Oct. 6, 2022

(65) Prior Publication Data
US 2024/0163011 A1 May 16, 2024

Related U.S. Application Data

(60) Provisional application No. 63/275,123, filed on Nov. 3, 2021, provisional application No. 63/249,233, filed
(Continued)

(51) Int. Cl.
*H04L 1/00* (2006.01)
*H04L 1/1812* (2023.01)
(Continued)

(52) U.S. Cl.
CPC .......... *H04L 1/0071* (2013.01); *H04L 1/1819* (2013.01); *H04L 1/1864* (2013.01); *H04L 1/1896* (2013.01)

(58) Field of Classification Search
CPC ... H04L 1/0071; H04L 1/1819; H04L 1/1864; H04L 1/1896
See application file for complete search history.

(56) References Cited

U.S. PATENT DOCUMENTS 10,863,494 B2 12/2020 Zhang et al.
2003/0152062 A1* 8/2003 Terry ................... H04L 1/1845
370/349
(Continued)

FOREIGN PATENT DOCUMENTS

WO 2020167650 A1 8/2020
WO 2021035458 A1 3/2021

OTHER PUBLICATIONS

Interdigital, Inc., "TB processing over multiple slots," 3GPP TSG RAN WG1 #107 -e, R1-2111793, e-Meeting (Nov. 11-19, 2021).
(Continued)

*Primary Examiner* — Mark D Featherstone
*Assistant Examiner* — Jeffrey Andrew Yang
(74) *Attorney, Agent, or Firm* — Volpe Koenig

(57) ABSTRACT

A method performed by a wireless transmit/receive unit (WTRU) may compromise: receiving configured grant (CG) information that includes: a configured grant period, an indication of a number of slots for Transport Block over Multiple Slots (TBoMS), and a mapping pattern; determining, for the CG period, a number of repetitions for a transport block (TB) based on (1) available UL slots in the CG period and (2) the number of slots for TBoMS; and on condition that DMRS bundling is disabled, and the determined number of repetitions is greater than 1, transmitting the TB with the determined number of repetitions where
(Continued)

segments of the TB are transmitted according to the mapping pattern for each repetition.

17 Claims, 24 Drawing Sheets

Related U.S. Application Data on Sep. 28, 2021, provisional application No. 63/185,759, filed on May 7, 2021, provisional application No. 63/168,106, filed on Mar. 30, 2021.

(51) Int. Cl.
   *H04L 1/1829*      (2023.01)
   *H04L 1/1867*      (2023.01)

(56) References Cited

U.S. PATENT DOCUMENTS

| | | | |
|---|---|---|---|
| 2019/0174466 A1 | 6/2019 | Zhang et al. | |
| 2021/0014095 A1* | 1/2021 | Ly | H04W 72/23 |
| 2021/0051707 A1 | 2/2021 | Rastegardoost et al. | |
| 2022/0045789 A1* | 2/2022 | Karmoose | H04L 1/0041 |
| 2022/0231899 A1* | 7/2022 | Khoshnevisan | H04L 27/2695 |
| 2022/0303987 A1* | 9/2022 | Sridharan | H04W 72/0446 |
| 2022/0303988 A1* | 9/2022 | Yi | H04L 1/189 |

OTHER PUBLICATIONS

Modertor (Nokia et al.), "FL summary of TB processing over multi-slot PUSCH (AI 8.8.1.2)," 3GPP TSG RAN WG1 #107-e, R1-2112462, e-Meeting (Nov. 11-19, 2021).

NTT Docomo, Inc., "New WID on NR UL Enhancements," 3GPP TSG RAN Meeting #94e, RP-212702, Electronic Meeting (Dec. 6-17, 2021).

Qualcomm Incorporated, "Joint channel estimation for PUSCH," 3GPP TSG-RAN WG1 Meeting #104-e, R1-2101479, e-meeting (Jan. 25-Feb. 5, 2021).

Qualcomm Incorporated, "Uplink enhancements for URLLC in unlicensed controlled environments," 3GPP TSG-RAN WG1 Meeting #104-e, R1-2101461, e-meeting (Jan. 25-Feb. 5, 2021).

TB processing over multiple slots TB processing over multiple slots, 3GPP TSG RAN WG1 #106bis-e, R1-2110153, e-Meeting (Oct. 11-19, 2021).

Third Generation Partnership Project, "Technical Specification Group Radio Access Network; NR; Physical channels and modulation (Release 16)," 3GPP TS 38.211 V16.4.0 (Dec. 2020).

Third Generation Partnership Project, "Technical Specification Group Radio Access Network; NR; Physical layer procedures for data (Release 16)," 3GPP TS 38.214 V16.4.0 (Dec. 2020).

Third Generation Partnership Project, "Technical Specification Group Radio Access Network; NR; Radio Resource Control (RRC) protocol specification (Release 16)," 3GPP TS 38.331 V16.3.1 (Jan. 2021).

Third Generation Partnership Project, "Technical Specification Group Radio Access Network; NR; Radio Resource Control (RRC) protocol specification (Release 16)," 3GPP TS 38.331 V16.7.0 (Dec. 2021).

Third Generation Partnership Project, "Technical Specification Group Radio Access Network; NR; Physical channels and modulation (Release 16)," 3GPP TS 38.211 V16.8.0 (Dec. 2021).

Third Generation Partnership Project, "Technical Specification Group Radio Access Network; NR; Physical channels and modulation (Release 17)," 3GPP TS 38.211 V17.0.0 (Dec. 2021).

Third Generation Partnership Project, "Technical Specification Group Radio Access Network; NR; Physical layer procedures for data (Release 16)," 3GPP TS 38.214 V16.8.0 (Dec. 2021).

Third Generation Partnership Project, "Technical Specification Group Radio Access Network; NR; Physical layer procedures for data (Release 17)," 3GPP TS 38.214 V17.0.0 (Dec. 2021).

\* cited by examiner

DMRS Bundling Window

502

DMRS Bundling Window

602

702

METHODS FOR DYNAMIC DATA TRANSMISSIONS IN WIRELESS SYSTEMS

CROSS-REFERENCE TO RELATED APPLICATIONS

This application is the U.S. National Stage, under 35 U.S.C. § 371, of International Application No. PCT/US2022/022099 filed Mar. 28, 2022, which claims the benefit of U.S. Provisional Application No. 63/168,106, filed Mar. 30, 2021, U.S. Provisional Application No. 63/185,759, filed May 7, 2021, U.S. Provisional Application No. 63/249,233, filed Sep. 28, 2021, and U.S. Provisional Application No. 63/275,123, filed Nov. 3, 2021, the contents of which are incorporated herein by reference.

BACKGROUND

In time domain duplex (TDD), a time symbol may be downlink, uplink or flexible according to a slot format. A wireless transmit/receive unit (WTRU) may receive semi-static configuration of slot format(s) and further receive dynamic indication of slot format by group-common signaling (SFI). Physical uplink shared channel (PUSCH) repetition mechanisms are supported in 3GPP. A PUSCH repetition overlapping with downlink symbol is not transmitted. However, there is no mechanism to automatically "postpone" a non-transmitted repetition. As a result, in TDD, each repetition bundle may have variable number of transmitted repetitions depending on the timing of this bundle.

At the time the WTRU processes a dynamic/configured grant with repetitions, the slot format may not be known for all future slots over which the set of repetitions may span. For example, the slot format of some slots may later be dynamically indicated by SFI. If the WTRU needs to transmit a set number of repetitions, the timing of the last repetition may not be known with certainty, which complicates WTRU implementation. A similar issue arises for multi-slot TB transmission in TDD.

SUMMARY

Disclosed are methods and apparatus to enable efficient control of WTRU transmissions in coverage-limited dynamic TDD scenarios when the WTRU is configured to use repetitions, transport block transmission over multiple slots and/or demodulation reference signal (DMRS) bundling.

A method performed by a wireless transmit/receive unit (WTRU) may compromise: receiving configured grant (CG) information that includes: a configured grant period, an indication of a number of slots for Transport Block over Multiple Slots (TBoMS), and a mapping pattern; determining, for the CG period, a number of repetitions for a transport block (TB) based on (1) available UL slots in the CG period and (2) the number of slots for TBoMS; and on condition that DMRS bundling is disabled, and the determined number of repetitions is greater than 1, transmitting the TB with the determined number of repetitions where segments of the TB are transmitted according to the mapping pattern for each repetition. The pattern may be an interleaved pattern. The method may further compromise, on condition that DMRS bundling is enabled, transmitting the TB with the determined number of repetitions, wherein the segments of the TB are transmitted sequentially for each repetition. The method may further compromise, on condition that the number or repetitions is 1, transmitting the TB with the determined number of repetitions, wherein the segments of the TB are transmitted sequentially. The CG information may further include an indication to perform TBoMS repetitions. The CG information may further include an indication that the DMRS bundling is disabled. The DMRS bundling may be disabled based on a disabling event occurring during the CG period. The disabling event may include using a slot format that includes non-consecutive slots for uplink transmissions.

A method performed by a wireless transmit/receive unit (WTRU) may compromise: receiving CG information that includes: a configured grant period, an indication of a number of slots for TBoMS, and a mapping pattern; determining, for the CG period, a number of repetitions for a TB based on available UL slots in the CG period and the number of slots for TBoMS; and on condition that DMRS bundling is enabled, transmitting the TB with the determined number of repetitions, wherein segments of the TB are transmitted sequentially for each repetition. The pattern may be an interleaved pattern. The CG information may further include an indication to perform TBoMS repetitions.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

DETAILED DESCRIPTION

Figure 1A:
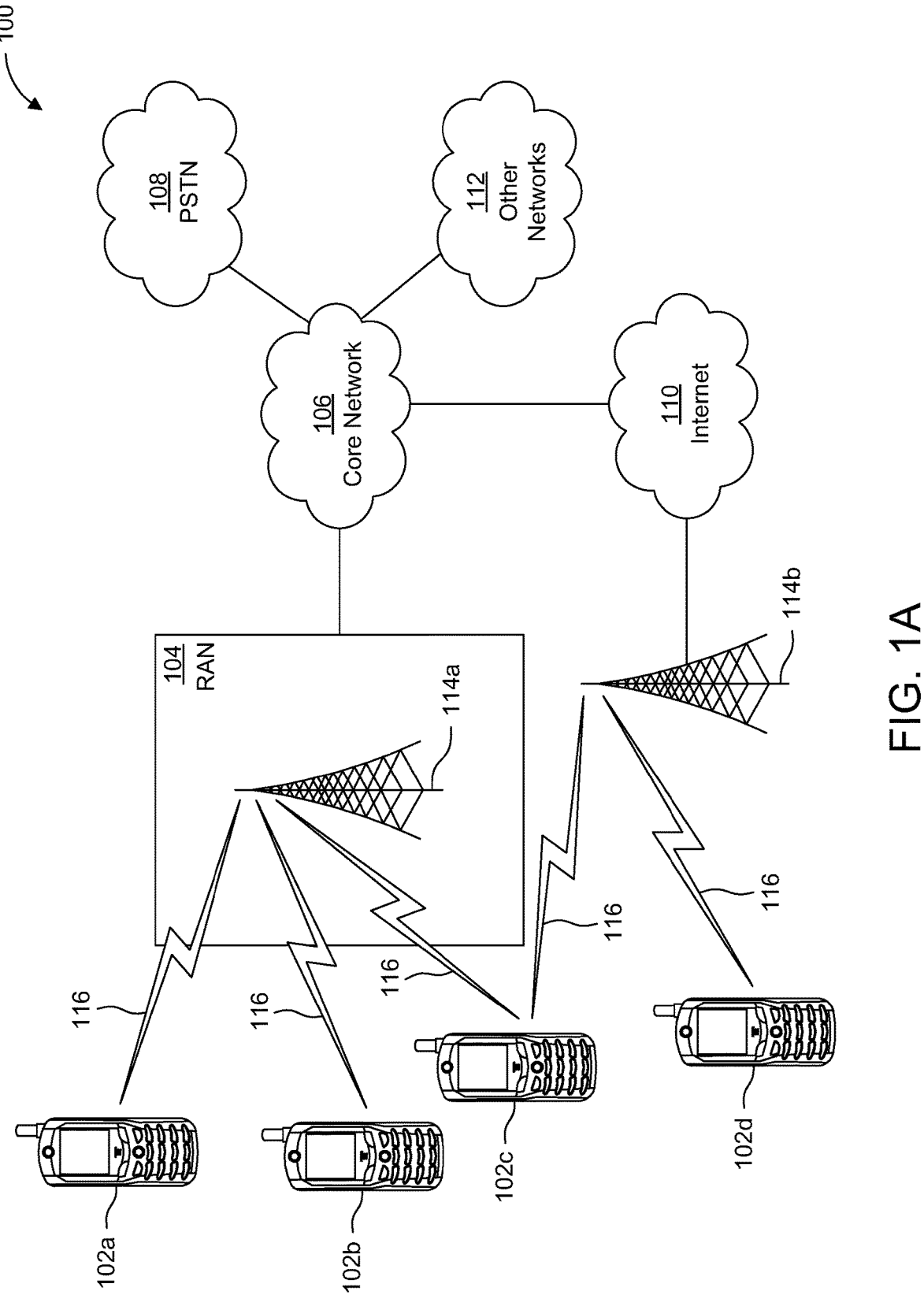
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
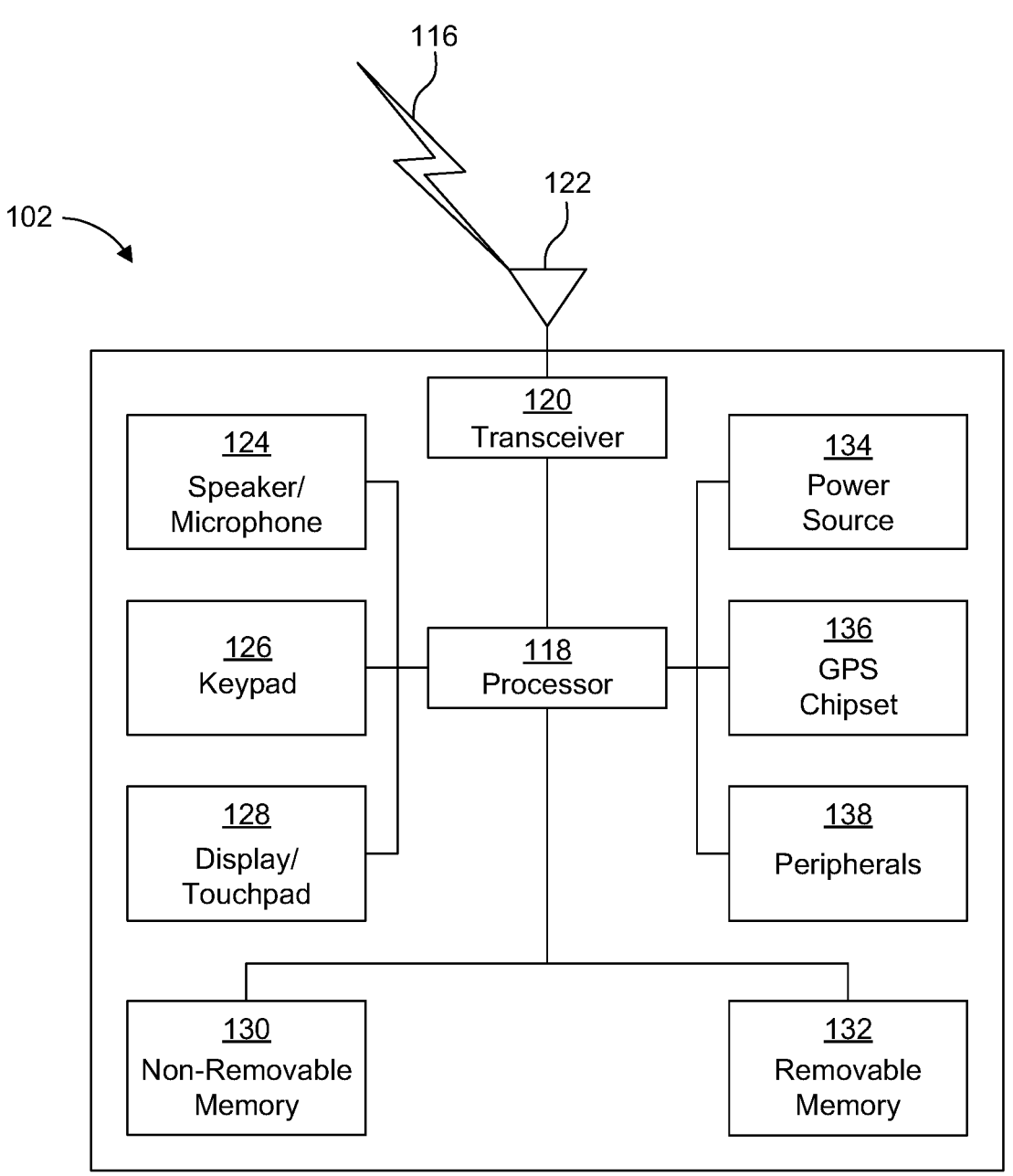
FIG. 1B is a system diagram illustrating an example wireless transmit/receive unit (WTRU) that may be used within the communications system illustrated in FIG. 1A according to an embodiment.
Figure 1C:
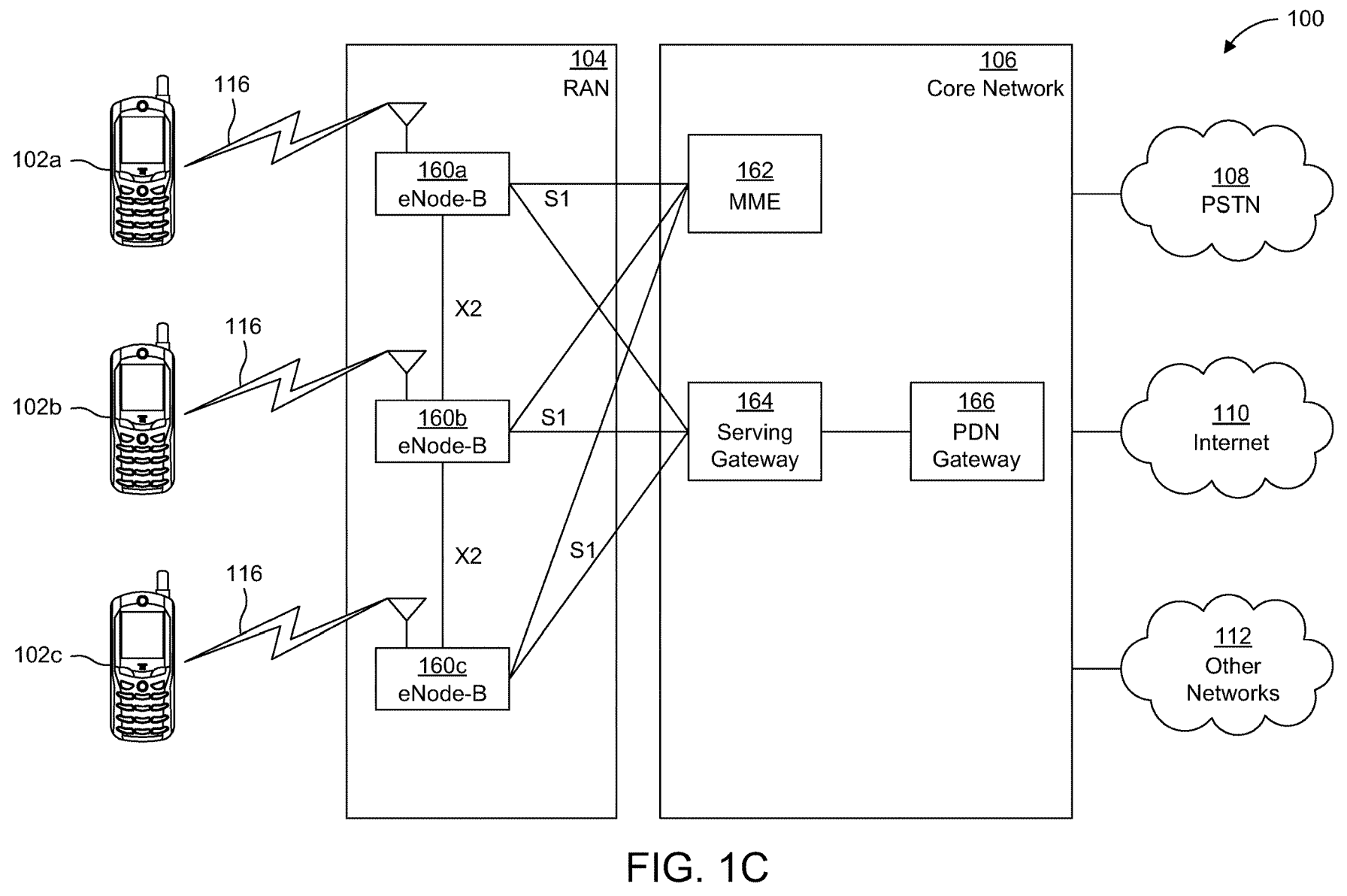

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
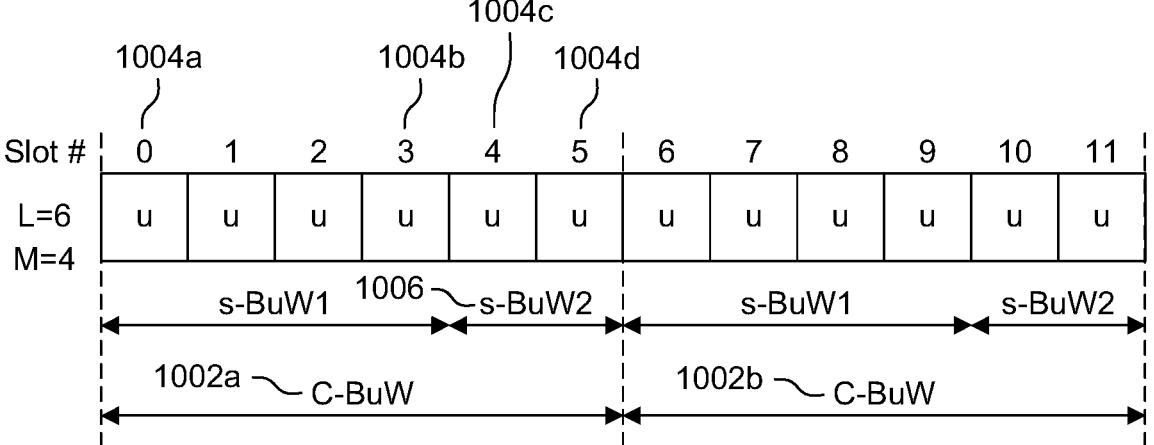
FIG. 10 is a diagram illustrating an example of the length when the configured bundling window is greater than the maximum duration.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
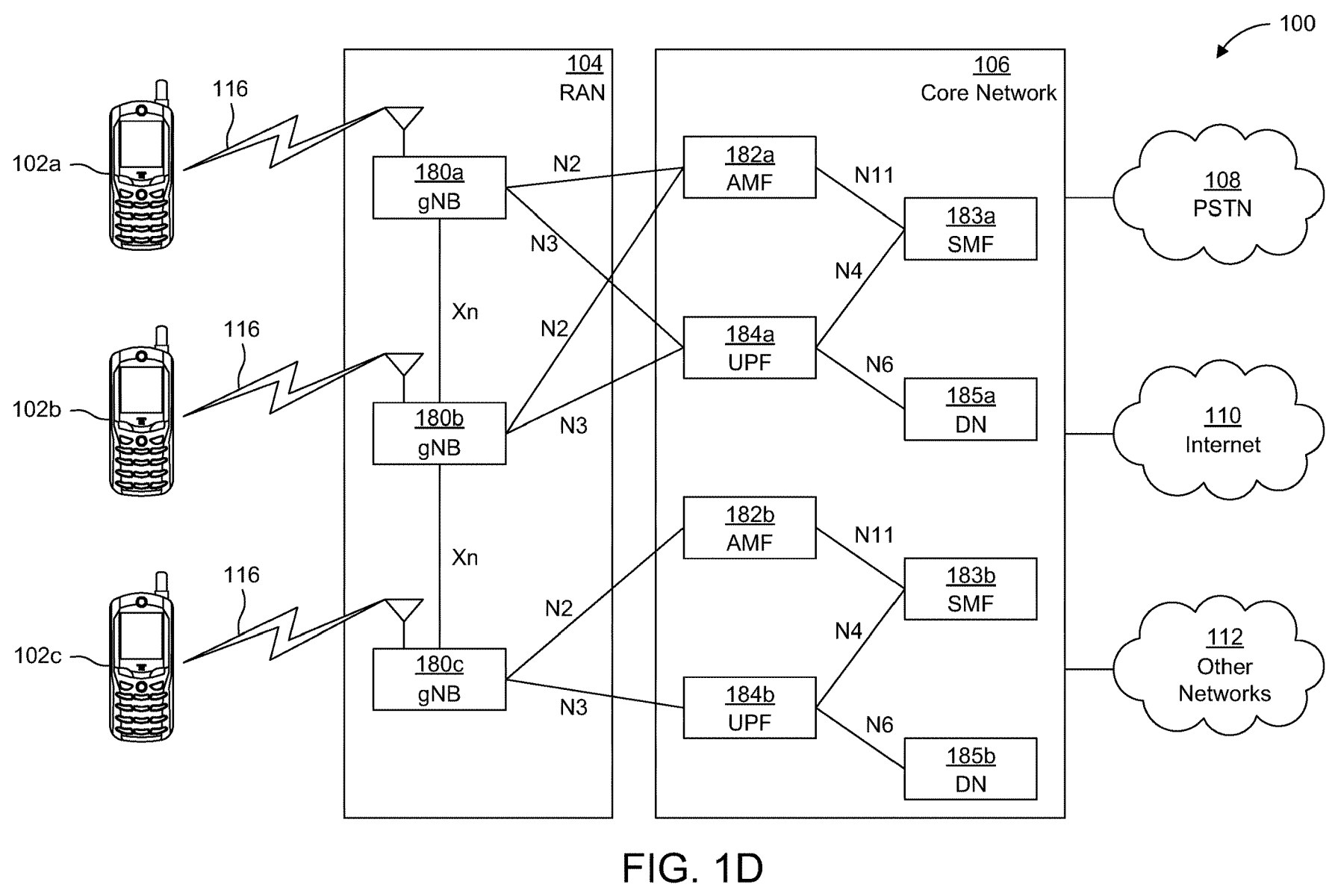

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations and acronyms may be referred to:

ACK Acknowledgement
BLER Block Error Rate
BWP Bandwidth Part
CAP Channel Access Priority
CAPC Channel access priority class
CCA Clear Channel Assessment
CCE Control Channel Element
CE Control Element
CG Configured grant or cell group
CP Cyclic Prefix CP-OFDM Conventional OFDM (relying on cyclic prefix)
CQI Channel Quality Indicator
CRC Cyclic Redundancy Check
CSI Channel State Information
CW Contention Window
CWS Contention Window Size
CO Channel Occupancy
DAI Downlink Assignment Index
DCI Downlink Control Information
DFI Downlink feedback information
DG Dynamic grant
DL Downlink
DMRS Demodulation Reference Signal
DRB Data Radio Bearer
eLAA enhanced Licensed Assisted Access
FeLAA Further enhanced Licensed Assisted Access
FDD Frequency Domain Duplexing
HARQ Hybrid Automatic Repeat Request
LAA License Assisted Access
LBT Listen-Before-Talk
LTE Long Term Evolution e.g. from 3GPP LTE R8 and up
NACK Negative ACK
MCS Modulation and Coding Scheme
MIMO Multiple Input Multiple Output
NR New Radio
OFDM Orthogonal Frequency-Division Multiplexing
PHY Physical Layer
PID Process ID
PO Paging Occasion
PRACH Physical Random Access Channel
PSS Primary Synchronization Signal
PUSCH Physical Uplink Shared Channel
QCL Quasi-Colocation
RA Random Access (or procedure)
RACH Random Access Channel
RAR Random Access Response
RCU Radio access network Central Unit
RF Radio Front end
RLF Radio Link Failure
RLM Radio Link Monitoring
RNTI Radio Network Identifier
RO RACH occasion
RRC Radio Resource Control
RRM Radio Resource Management
RS Reference Signal
RSRP Reference Signal Received Power
RSSI Received Signal Strength Indicator
SDU Service Data Unit
SFI Slot Format Indicator
SRS Sounding Reference Signal
SS Synchronization Signal
SSS Secondary Synchronization Signal
SWG Switching Gap (in a self-contained subframe)
SPS Semi-persistent scheduling
SUL Supplemental Uplink
TB Transport Block
TBoMS Transport Block over Multiple Slots
TBS Transport Block Size
TDD Time Domain Duplexing
TRP Transmission/Reception Point
TSC Time-sensitive communications
TSN Time-sensitive networking
UL Uplink
URLLC Ultra-Reliable and Low Latency Communications
WBWP Wide Bandwidth Part WLAN Wireless Local Area Networks and related technologies (IEEE 802.xx domain)

PUSCH repetitions may be transmitted over semi-statically configured uplink slots and the number of repetitions may incremented over downlink or uplink slots. In Vol P, while achieving coverage enhancement, latency requirements need to be satisfied. In TDD using only semi-statically configured resources, the WTRU may not be able to complete its transmission(s) to simultaneously satisfy coverage and the latency requirement. In a dynamic TDD scenario, flexible symbols or slots may switch to uplink symbols or slots dynamically, presenting an opportunity for repetitions to be completed earlier, thus being able to meet the latency requirement. The problem considered here may be more critical for a configured grant. The WTRU behavior which distributes transmission(s) depending on availability of semi-statically configured resources and dynamic resources are described below.

In one embodiment, the WTRU may determine, from the semi-static configuration, whether the second set of repetition may be configured or not (e.g., the WTRU either transmits only on semi-statically configured uplink slots or on both semi-statically and dynamically configured uplink slot). The first set of resources may be determined at the time the grant is received (i.e., confirmed availability of resources) while the second set of resources may be determined based on at least subsequent dynamic signaling (e.g., SFI) (i.e., unconfirmed availability of resources).

Figure 2:
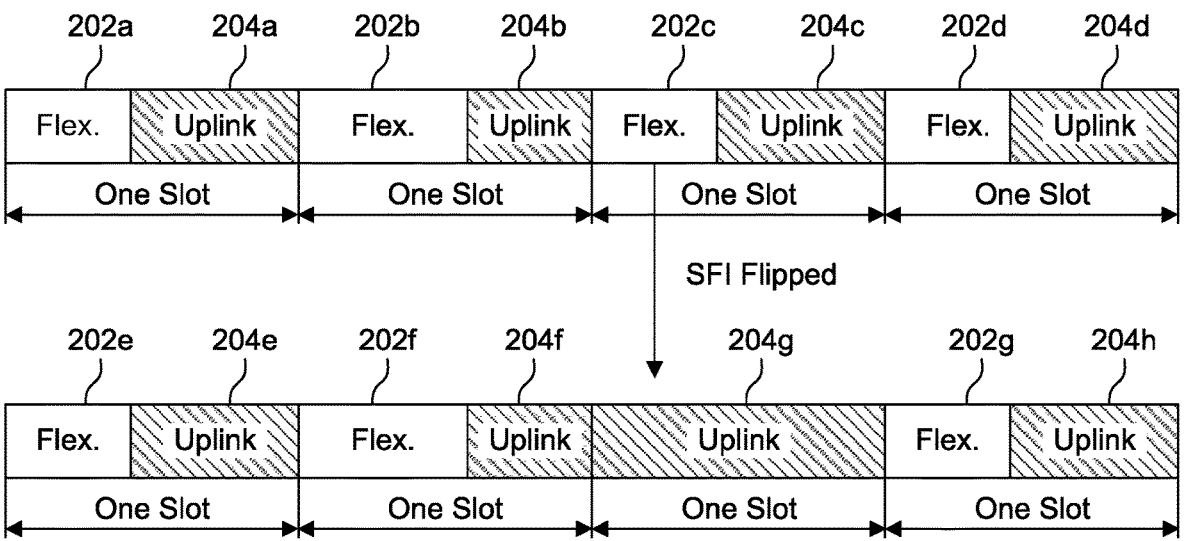
FIG. 2 is a diagram illustrating an example where the in a TDD, a time symbol may be a downlink, uplink, or flexible according to a slot format.

FIG. 2 illustrates an example where the in a TDD, a time symbol may be a downlink, uplink, or flexible according to a slot format. The TDD may have flexible time symbols 202a, 202b, 202c, 202d, 202e, 202f, and 202g. The TDD may have uplink time symbols 204a, 204b, 204c, 204s, 204e, 204f, 204g, and 204h.

Figure 3:
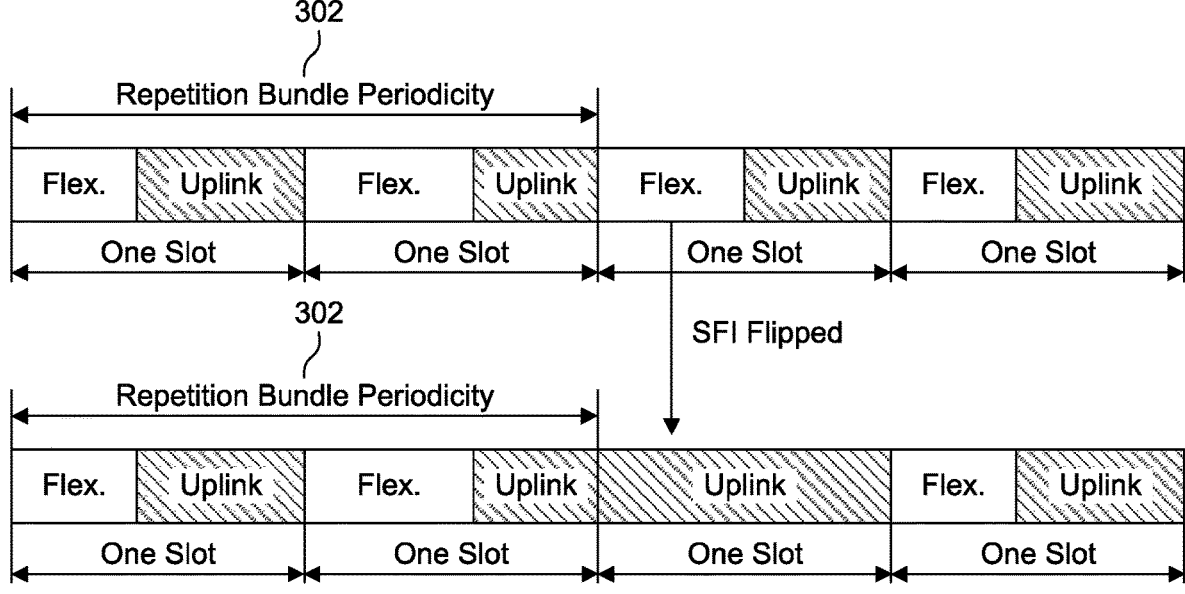
FIG. 3 is a diagram illustrating an example where the repetition bundle cannot capture available uplink symbols when it exceeds repetition bundle periodicity.

FIG. 3 illustrates another embodiment in which the WTRU may stop the repetitions if the repetition bundle, including a second set of resource, exceeds periodicity of the repetition bundle periodicity 302.

In another embodiment, when one transport block (TB) is transmitted over the first set of resources, the WTRU may split a nominal transmission into N sub-transmissions, map them to a second set of resources, and terminate sub-transmission when no more resources are available in the second set of resources where N is an integer.

Figure 4:
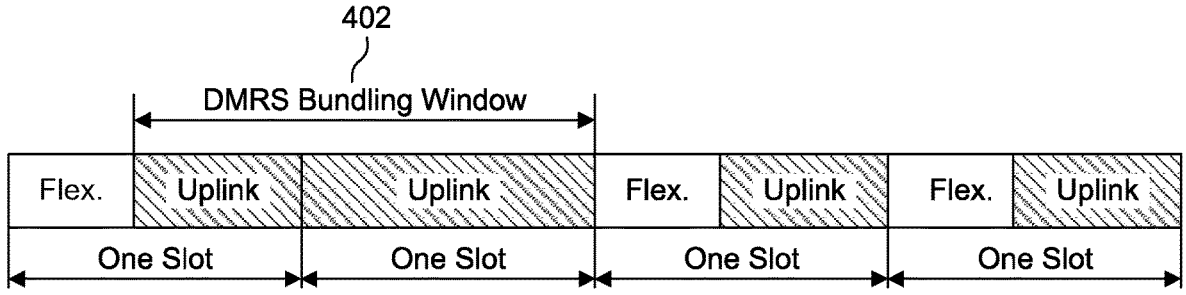
FIG. 4 is a diagram illustrating an example DMRS bundling window not including flexible symbols.

In another embodiment, the WTRU may determine to exclude the second set of resources from DMRS bundle if the window to bundle DMRSs does not include the second set of resources. This is shown in FIG. 4, which illustrates an example of a DMRS bundling window 402 that does not include flexible symbols.

Figure 5:
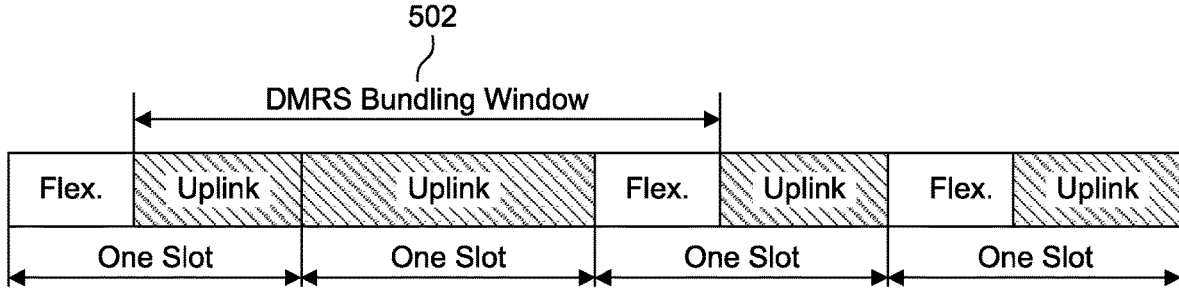
FIG. 5 is a diagram illustrating an example of DMRS bundling window including flexible symbols.

The WTRU may also include the second set of resources in the DMRS bundle if the window to bundle DMRS in includes the second set of resource. This is shown in FIG. 5, which illustrates an example of a DMRS bundling window 502 that includes flexible symbols. The network may configure the DMRS bundling window to include flexible symbols in case the network senses that there could be benefit for further increasing the number of DMRS symbols in the bundle and wants to have a flexible room to stretch the window.

At the time the WTRU processes a dynamic/configured grant with repetitions, the slot format may not be known for all future slots over which the set of repetitions may span. For example, the slot format of some slots may be dynamically indicated by a SFI later on. If the WTRU needs to transmit a set number of repetitions, the timing of the last repetition may not be known with certainty, which complicates WTRU implementation. Ensuring the required number of repetitions is transmitted while maintaining predictable timing for the last repetitions needs to be considered. A similar issue arises for multi-slot TB transmission in TDD.

The WTRU may receive an indication to transmit a set of PUSCH repetitions by DCI. The WTRU may also receive a configured grant configuration by RRC signaling indicating a set of PUSCH repetitions recurring periodically. In case the configured grant is of type 2, the WTRU may also receive an activation command by DCI.

The WTRU may receive slot configuration information by configuration and/or DCI. The slot configuration information may indicate whether a symbol is downlink, uplink or flexible for one or more slots.

In one embodiment, the WTRU may determine two sets of resources for potential transmission of at least one of the following: (1) PUSCH repetitions type A or type B; (2) multi-transport block PUSCH (multi-TB PUSCH); (3) transmission of a transport block over multiple slots (TBoMS); and/or (4) PUCCH repetitions.

A first set of resources may be referred to as "known" resources and a second set of resources may be referred to as "potential" resources. The resources may be defined in terms of time slots, time symbols and/or resource blocks. At least the following aspects of WTRU transmission may depend on whether the transmission takes place over a resource identified as part of the first or second set: (1) whether a repetition counter is incremented for a transmission over the resource; (2) whether DMRS bundling is assumed between transmissions (PUCCH or PUSCH) over a resource over the first and/or second set, including RS configuration aspects; and/or (3) which instance of a TBoMS transmission the resource belongs to. These aspects are described in more detail below.

The determination of whether a resource belongs to a first or second set may be based on signaling that the WTRU has already received at a specific time, hereinafter called "determination time". The determination time may be a function of at least one of implementation described below.

In one implementation, the determination time may be a function of the timing of a DCI. The DCI may include the dynamic grant indicating the repetitions or activating or re-activating a configured grant type 2 that is configured with repetitions. The DCI may indicate the multi-TB PUSCH or the TBoMS PUSCH. The timing may be the end of the last symbol of the PDCCH carrying the DCI, or of a CORESET where the WTRU detects the DCI.

In another implementation, the determination time may be a function of a time offset pre-defined or signaled by higher layers or by DCI. Such time offset may be added to, or subtracted from, one of the other times.

In another implementation, the determination time may be a function of the timing of a first PUSCH repetition or potential PUSCH repetition within a bundle of repetitions indicated by DCI or configured periodically as part of a configured grant configuration. The timing may be the first symbol.

In another implementation, the determination time may be a function of the timing of a multi-TB PUSCH transmission or of a TBoMS transmission. The timing may be the first symbol.

In another implementation, the determination time may be a function of the PUSCH preparation time (e.g. Tproc,2) applicable to a PUSCH repetition for the PUSCH timing capability of the WTRU. For example, the determination time may depend on, or correspond to, the time of a first PUSCH repetition minus the PUSCH preparation time.

In one implementation, the determination time may be a function of whether the grant is a dynamic grant, a configured grant type 1 or configured grant type 2. For example, the determination time may correspond to the timing of a first PUSCH repetition minus a PUSCH preparation time in case of a configured grant type 1, and based on timing of a DCI.

At the determination time, the WTRU may determine the set of known resources based on at least one of the following embodiment described below. Any resource over which a PUSCH transmission may be possible but that is not part of the set of known resources may be included in the set of "potential" resources.

In one embodiment, the WTRU may determine the set of known resources as resources indicated to be available for PUSCH transmission based on a semi-static configuration only. The semi-static configuration may include, for example, information elements for the TDD UL/DL configuration (common or dedicated), and whether the WTRU is configured for monitoring a slot format indicator (SFI) by DCI.

In another embodiment, the WTRU may determine the known resources as resources indicated to be available for PUSCH transmission based on both semi-static configuration and dynamic signaling already received at the determination time. Such dynamic signaling may include for example SFI received from DCI format 2-0. The received SFI(s) may provide a slot format indication for current slot and some future slots.

The WTRU may include the following symbols in the known resources from the above information: (1) symbols identified as "uplink" and/or (2) symbols identified as "flexible" if the indication of the repetitions is by DCI (i.e., dynamic grant or configured grant type 2). The symbols may identify as "flexible" in cases where the WTRU is not configured for monitoring SFI and/or in cases where the WTRU received SFI applicable to the symbol.

In another embodiment, the WTRU may determine PUSCH repetitions or a set of PUSCH transmissions for multi-TB transmission from the known and potential resources using the following solutions. For simplicity, such embodiments are described as applied for PUSCH repetitions but are equally applicable to multi-TB transmission.

The WTRU may determine a first set of repetitions applicable to the known resources at the determination time. Such set of repetitions may be referred to as the "known set of repetitions."

The WTRU may determine a target number of known repetitions $K_n$ by receiving semi-static configuration (e.g., in case of configured grant) or in the DCI containing the dynamic grant. The WTRU may determine what set of PUSCH repetitions could be transmitted using the known resources only, excluding potential resources and other resources not available for uplink. The WTRU may determine the known set of repetitions as the first $K_n$ repetitions.

The known set of repetitions may be restricted to a time interval starting at the determination time and ending $T_{max}$ later. In such case, the number of known repetitions may be less than $K_n$. The value of $T_{max}$ may be configured by higher layers or signaled in the DCI. A default value of $T_{max}$ may correspond to the periodicity of a corresponding configured grant configuration.

The WTRU may determine additional repetitions applicable to the potential resources. Such determination may take place later than the determination time for the minimum set of repetitions. For example, additional repetitions may be identified upon reception of SFI after the determination time of known repetitions which indicate uplink symbols or slots.

Additional repetitions may be restricted to a time interval starting at the determination time and ending at one of the following times: (1) before the start of the last repetition from the set of known repetitions; and/or (2) $T_{maxadd}$ later than the determination time of the known repetition, the value of which may be the same as the one used for the known set of repetitions. Additional repetitions may also be restricted to a maximum number $K_{maxadd}$.

The WTRU may determine whether it transmits additional repetition and/or the values of at least one parameter (e.g., $K_n$, $T_{max}$, $T_{maxadd}$, $K_{maxadd}$) and applicability to dynamic grant or each configured grant configuration based on received signaling by RRC, MAC CE or DCI. For example, such signaling may be at least one of the following:

Such signaling may be an indication received in the DCI indicating the set of repetitions or activating the configured grant type 2. For example, in case of an indication by DCI, an additional column of a time domain resource allocation (TDRA) table may indicate whether additional repetitions should be transmitted.

Such signaling may be an indication in a MAC CE. For example, such MAC CE may provide an indication of whether additional repetitions are transmitted for at least one configured grant configuration and/or for dynamic grant. The at least one configuration may be identified by an index included in the MAC CE, or implicitly by the order of parameters within the MAC CE.

Such signaling may be an indication received in a group-common DCI. For example, a DCI format 2_0 may be extended to include information on whether the WTRU should transmit additional repetitions over a slot or a set of symbols. Such indication may be by new fields within the DCI or may be indicated through SFI. In the latter case, higher layers may configure whether additional repetitions are transmitted for each slot format or slot format indication. The configuration or indication may further include applicability to dynamic grant or configured grant possibly for each configured grant configuration. Indication by group-common DCI may have the benefit of enabling efficient scheduling of resources for different WTRUs.

The embodiments described are applicable when transform precoding is enabled or disabled (i.e., not enabled).

In one embodiment, the WTRU may apply a redundancy version (RV) to a repetition that depends on whether the repetition belongs to a known or an additional set of repetitions. For example, the RV applied to a repetition belonging to a known set of repetitions may be a first function of the order of this repetition within the known set. The RV may be a function of n mod K for the nth repetition of the known set, where K is a number of redundancy versions (e.g., K=4). Similarly, the RV applied to a repetition belonging to an additional set of repetitions may be a second function of the order of this repetition within the additional set. The first and second functions may be identical or different. For example, for the known repetitions the function may cycle through a first sequence of RVs such as [0 2 3 1] while for the additional repetitions the function may be to select a certain RV independent of the repetition order. At least one of the first and second function may also take a parameter indicated by DCI or configured by RRC as input. For example, a field in DCI indicating a set of repetitions may indicate the RV for the initial repetition (or for all repetitions).

Alternatively, the RV applied to a repetition belonging to an additional set of repetitions may be set to the same RV as the previous or next repetition belonging to the known set. In other words, the WTRU may only change the RV for a repetition belonging to the known set. Alternatively, the RV applied to a repetition may be a function of the order of the repetition across known and additional repetitions.

The WTRU may also be configured with a threshold for a target number of repetitions, whereby the WTRU keeps repeating until counting and/or transmitting the target number of repetitions. In one example, the WTRU may stop repeating a TB, even if the target number of repetitions has not been reached—upon reaching the last PUSCH transmission occasion in a bundle, and/or before starting another PUSCH occasion for the next repetition bundle (e.g., for the same HARQ process). This ensures that each start for a repetition bundle starts with the RV of configured for the initial repetition transmission and provides predictability for the timing of the last transmission.

The WTRU may consider a slot available for UL transmission (e.g., part of the UL known resource set) if no indication for cancelation or deprioritization was received or determined, including reception of CI cancellation or an intra-WTRU prioritization determination. The WTRU may consider a resource for which an intra-WTRU or inter-WTRU cancellation/deprioritization indication was received/determined as a potential resource. The WTRU may increase the repetitions counter only for UL repetitions transmitted on slots part of the UL known resource set. The WTRU may not increase the repetition count after the transmission of a repetition on a slot part of a potential resource, including slots for which a cancellation indication or a deprioritization was received/determined. A deprioritized transmission may include transmissions that have started or not yet started but are pending in the WTRU, e.g. due to intra-WTRU prioritization.

For a cancelled repetition, either by cancellation indication or deprioritization, they WTRU may still increment the RV counter/version even though the WTRU may not transmit the full repetition on the UL slot, possibly even if the slot is deemed as a potential resource. Alternatively, the WTRU may increment the RV version only if the full repetition is transmitted.

The WTRU may determine to bundle DMRS symbols from multiple slots or multiple PUSCH/PUCCH transmissions/repetitions. The gNB may receive transmitted PUSCH(s)/PUCCH(s) from the WTRU and use bundled DMRS symbols to perform joint channel estimation.

The WTRU may transmit PUSCH(s) and/or PUCCH(s) on a dynamic or configured grant. The WTRU may receive configuration for a DMRS bundling window during which the WTRU is expected to preserve phase and power continuity. The parameters of the window may be indicated by the gNB (e.g., part of DCI signaling) or configured by higher layers. The dynamic signaling for an allocated/specific grant may modify a configured value for the parameters for the window. The WTRU may transmit DMRS and other RS according to a configuration specific to the DMRS bundling window or a property thereof, such as a duration in symbols and/or slots. The WTRU may receive configurations related to a bundling window in configured/dynamic grant configuration. A "bundling window", "window", "time window," or "DMRS bundling window" may be used interchangeably. The parameters of the aforementioned window may be determined based on the WTRU capability.

The length of a bundling window may be defined by the number of symbols, slots or frames. The parameters for a bundling window may include at least one of the following parameters: (1) parameters for a bundling window may include parameters indicating duration/length of the window, e.g., the number of symbols, slots or frames; (2) parameters for a bundling window may include a starting position/location or ending position/location of the window, e.g., symbol/slot/frame number or SFN where the window starts, symbol/slot/frame number where the window ends; (3) parameters for a bundling window may include a starting position/location of DMRS bundling process within a window e.g., symbol/slot/frame number or SFN where the DMRS bundling process starts, symbol/slot/frame number where the window ends; (4) parameters for a bundling window may include an offset of the window in symbols/slots/frames with respect to a reference location indicated by SFN, symbol number or slot number; and (5) parameters for a bundling window may include a type of the window, e.g., aperiodic, semi-persistent or periodic.

The WTRU may perform/process DMRS bundling by preserving phase or power continuity among uplink symbols/slots during the DMRS bundling window. The WTRU may perform DMRS bundling over PUSCH(s)/PUCCH(s) transmitted in the known slot resources (e.g. slots/symbols semi-statically configured as uplink slots/symbols). For example, if a bundling window covers/includes the known resources, the WTRU may bundle DMRS symbols in PUSCH(s)/PUCCH(s) that are transmitted over the known resources within the DMRS bundling window.

The WTRU may perform DMRS bundling if a bundling window covers/includes PUSCH(s) or PUCCH(s) in the known resources and known resources are not contiguous (e.g., uplink symbols/slots are not contiguous).

The WTRU may not perform DMRS bundling even if a bundling window includes/covers the potential uplink resources (e.g. a flexible TDD slot/symbols that maybe dynamically indicated as an uplink slot/symbol) and potential resources contain DMRS.

A DMRS bundle may contain DMRS symbols from PUSCH(s) or PUCCH(s) transmissions/repetitions. The WTRU may preserve power or phase continuity over DMRS symbols in a DMRS bundle.

The WTRU may determine to include DMRS symbols in PUSCH(s) or PUCCH(s) scheduled in potential uplink resources in a separate DMRS bundle from a DMRS bundle containing DMRS symbols in PUSCH(s) or PUCCH(s) scheduled in known uplink resources under one of the following conditions: (1) if the bundling window covers/includes both known and potential resources and/or (2) if the bundling window cover/includes back-to-back in known and potential uplink resources (e.g., zero gap in-between adjacent uplink known and potential resources).

The WTRU may determine to disable DMRS bundling if a bundling window includes/covers only potential resources.

Figure 6:
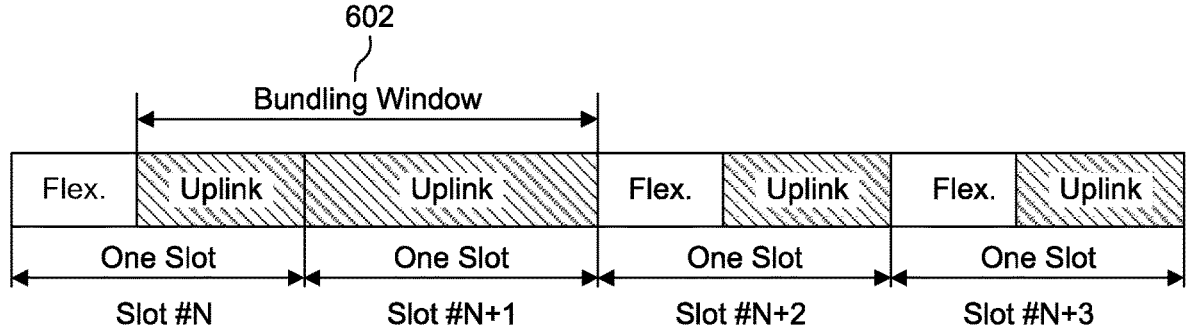
FIG. 6 is a diagram illustrating an example DMRS bundling window not including flexible symbols.

The WTRU may receive configurations from the gNB via DCI/MAC-CE/RRC to perform at least one of the following below described rules to determine whether to include DMRS symbols in potential resources:

In one rule, as shown in FIG. 6, the WTRU may include DMRS symbols in a separate DMRS bundle in PUSCH(s)/PUCCH(s) in potential resources from the DMRS bundle which include DMRS in known resources if the bundling window 602 does not include the potential resources (e.g., window does not include flexible symbols).

The WTRU may include DMRS symbols in PUSCH(s)/PUCCH(s) in potential resources in the DMRS bundle if the bundling window includes potential resources (e.g., as shown in FIG. 6 where the window includes flexible symbols and where the bundling window is denoted as "Bundling window.") The network may configure the bundling window to include flexible symbols in case the network determines to stretch the bundling window).

The WTRU may include DMRS symbols in a separate DMRS bundle in PUSCH(s)/PUCCH(s) in potential resources in the DMRS bundle if the bundling window includes potential resources.

The WTRU may determine to follow at least one of the above rules under at least one of the following conditions: (1) the WTRU receives configuration to follow at least one of the above rules via DCI/MAC-CE/RRC; (2) quality of channel estimation is at or above (or below) a threshold configured by the gNB; (3) doppler shift or spread is at or above (or below) a threshold configured by the gNB; and/or (4) detected carrier frequency offset is at or above (or below) a threshold configured by the gNB.

Figure 7:
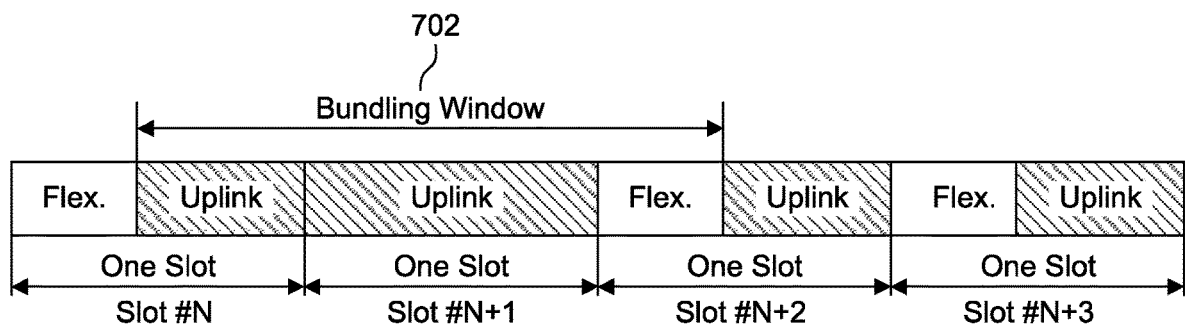
FIG. 7 is a diagram illustrating an example of DMRS bundling window including flexible symbols.

FIG. 7 illustrates an example where the DMRS bundling window does include flexible symbols. As shown in FIG. 7, the bundling window 702 does not include flexible symbols.

The WTRU may receive a duration, L, for the bundling window from the gNB via RRC, MAC-CE or DCI.

Figure 8:
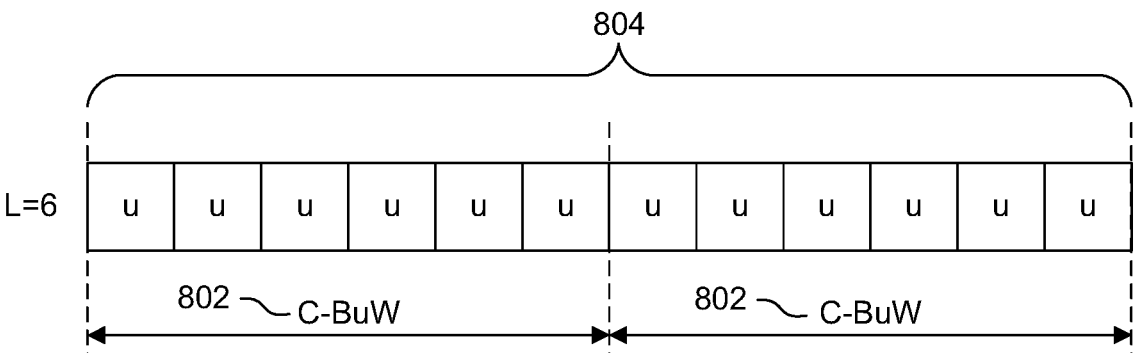
FIG. 8 is a diagram illustrating an example of a configured bundling window (C-BuW)

FIG. 8 illustrates an example of a configuration bundling window (C-BuW) 802. As shown in FIG. 8, 12 uplink slots 804 are allocated for the WTRU. The duplexing mode may be FDD or TDD.

In FIG. 8, the WTRU is configured with the duration of the bundling window, L=6. The duration during which the WTRU is expected to maintain phase continuity and/or power consistency is indicated by the Configured Bundling Window (C-BuW) 802. The WTRU may receive a configuration for the bundling window which may include a length of the window and starting position of the window. The starting position of the window may be determined implicitly. For example, the starting position of the window may be the first symbol/slot of the PUSCH repetitions with which the configured bundling window is associated.

Figure 9:
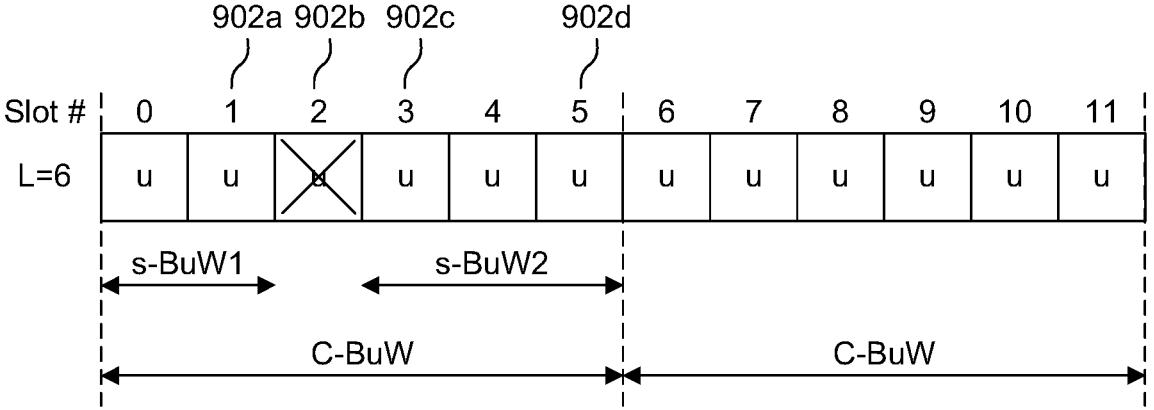
FIG. 9 is a diagram illustrating an example of a configured bundling window (C-BuW) with cancellation of uplink transmission.

As shown in FIG. 9, the WTRU may receive an indication from the gNB to cancel uplink transmission at slot #2 902b. In that case, the WTRU may not be able to maintain phase continuity and/or power consistency during the configured bundling window. In this case, the WTRU may determine, implicitly, to split the configured window into two or more sub-windows as illustrated in the FIG. 9. The WTRU may determine to end the window at the last symbol/slot of the PUSCH repetitions, i.e., the end of the first sub-window, s-BuW1, is last symbol of slot #1 902a or at the end of slot #1 902a. The WTRU may start the second sub-window, s-BuW2, from the first symbol in slot #3 or the beginning of slot #3 until the of end of the C-BuW, the last symbol of slot #5 902d or end of slot #5 902d.

During each sub-window, the WTRU may be expected to maintain power consistency and/or phase continuity such that the receiver, gNB, may perform joint channel estimation using DMRS symbols in the PUSCH(s) in the sub-window(s). However, the WTRU may not be expected to maintain power consistency and/or phase continuity across sub-windows. For example, the WTRU may not be expected to maintain power consistency and/or phase continuity between symbols in slot #1 and symbols in slot #3 902c.

The event that disrupts power consistency and/or phase continuity may be at least one of the following events: (1) reception of PDCCH or PDSCH; (2) conversion of a uplink symbol(s)/slot(s) to downlink symbol(s)/slot(s); (3) conversion of a flexible symbol(s)/slot(s) to downlink symbol(s)/slot(s); (4) DL or UL slot/symbol format/configuration (e.g., DL slots/symbols disrupt power consistency and/or phase continuity); (5) application of timing advance or power control; and/or (6) DL reception monitoring.

The WTRU may determine to terminate DMRS bundling (i.e., maintenance of phase continuity and power consistency) after the event which disrupts power consistency and/or phase continuity depending on WTRU capability. In another example, the WTRU may stop DMRS bundling if the duration WTRU maintained phase continuity and/or power consistency prior to the event is greater or less than or equal to the threshold configured by the network. In another example, the WTRU may determine to count how many events occurred during the configured bundling window. If the number of occurrences is greater or equal to the configured threshold, the WTRU may stop DMRS bundling.

In another example, the WTRU may send an UCI to indicate to the network that the WTRU stops DMRS bundling. The WTRU may send the UCI to the network based on one of the following conditions: (1) doppler shift/spread of the channel is above or equal to the threshold; (2) the WTRU detects change in phase or power and change is above or equal to the threshold; and (3) WTRU mobility (e.g., speed) is above or equal to the threshold The maximum duration may be defined by the duration the WTRU may maintain phase continuity and/or power consistency. The WTRU may be requested by the gNB to send the maximum duration to the gNB in capability signaling. The WTRU may receive a configuration for the duration/length of the configured bundling window which is greater than the maximum duration. In this case, the WTRU may implicitly determine to split the configured bundling window into multiple sub-windows such that the maximum duration of each sub-window is not greater than the maximum duration.

FIG. 10 is an example of a length when the C-BuW is greater than the maximum duration. In FIG. 10 where the maximum duration is M=4, the WTRU may be capable of maintaining phase continuity and/or power consistency for 4 slots. When the WTRU receives the configuration for the configured bundling window with L=6 from the gNB, the WTRU may determine to split the configured bundling window into multiple sub-windows such that the maximum duration of each sub-window is M (e.g., M=4). As shown in FIG. 10, the WTRU may start the first sub-window, s-BuW1 from slot #0 1004a and ends at the end of slot #3 1004b. The WTRU starts another window, s-BuW2 1006, at the beginning of slot #4 1004c and terminates the window at the end of slot #5 1004d, which is the end of the configured bundling window 1002a.

The WTRU may apply transmission power reduction or offset once the WTRU receives a configuration for the bundling window from the gNB. The WTRU may apply —N dB power reduction before transmission of PUSCH in the configured bundling window. The WTRU may receive reduction in transmission power, N, from the gNB in the same configuration for the time window or separately from the gNB via DCI, MAC-CE or RRC.

Alternatively, the WTRU may determine reduction in transmission power depending on the length of the bundling window configured by the gNB. For example, the WTRU may use a lookup table to determine the reduction in transmission power associated with the length of the bundling window. For example, if the duration of the bundling window is 3 slots, the WTRU may determine to reduce the transmission power by 1 dB. If the duration of the bundling window is 6 slots, the WTRU may determine to reduce the transmission power by 2 dB. The WTRU may determine reduction of transmission power based on at least one or combination of the following:

The WTRU may determine reduction of transmission power based on the duration/length of the bundling window. The WTRU may determine reduction of transmission power based on the modulation coding schemes (MCS) used for the PUSCH in the DMRS bundling window (e.g., if QPSK is used for PUSCH scheduled in the bundling window, the WTRU may determine to reduce the transmission power by 2 dB. If 16QAM is used for PUSCH scheduled in the bundling window, the WTRU may determine to reduce the transmission power by 1 dB). The WTRU may determine reduction of transmission power based on the number of DMRS symbols in the bundling window (e.g., if 8 DMRS symbols are configured for PUSCHs scheduled in the bundling window, the WTRU may determine to reduce the transmission power by 1 dB. If 16 symbols are configured for multiple PUSCH scheduled in the bundling window, the WTRU may determine to reduce the transmission power by 2 dB). The WTRU may determine reduction of transmission power based on the explicit indication from the gNB (e.g., gNB configures N). The WTRU may also determine reduction of transmission power based on the channel condition (e.g., Doppler shift). The WTRU may also determine reduction of transmission power based on the WTRU capability (e.g., WTRU is not capable of starting a new sub-window after the event).

The WTRU may apply the default transmission power or transmission power prior to the reduction of transmission power after bundling window expires (e.g., outside of the duration of the bundling window, the WTRU completes PUSCH transmission associated with the bundling window). The WTRU may apply a different transmission power reduction if a new bundling window starts. For any PUSCH transmission, the WTRU may apply an offset to the transmission power that depends on whether the PUSCH is associated to a bundling window and other parameters listed in the above. The offset may be zero (0) dB for a PUSCH that is not associated to a bundling window.

The term "PUSCH", "multiple PUSCHs", "multiple PUSCH" or "PUSCH repetitions" may be used interchangeably. Multiple PUSCH repetitions may be scheduled in the bundling window. The bundling window may be associated with the PUSCH repetitions or PUSCH(s)(i.e., the beginning of the bundling window is the beginning of the first transmission of PUSCH repetitions/PUSCH(s) and end of the bundling window is the last transmission of PUSCH repetitions/PUSCH(s)). The PUSCH(s) may be generated based on one TB or multiple TB(s) (i.e., one PUSCH corresponds to one TB).

In an embodiment, the WTRU may receive a look up table via RRC from the gNB associating transmission power reduction and duration/length of the bundling window. The WTRU may then receive a configuration for the bundling window (e.g., duration/length of the bundling window) via RRC from the gNB. The WTRU may then receive schedules for PUSCH(s) in the bundling window in DCI. The WTRU may then reduce transmission power for PUSCH(s) during the bundling window. The WTRU may then reinstate the transmission power to the power level prior to application of reduction of transmission power once the bundling window expires.

The WTRU may determine to apply transmission power reduction at the beginning of a sub-window or configured window. The WTRU may receive an indication in PDCCH or PDSCH to reduce power in the middle of configured bundling window. In that case, the WTRU may determine to apply transmission power reduction at the beginning of the next earliest sub-window.

Since DMRS bundling offers coverage enhancement, the WTRU may be able to preserve coverage performance by decreasing transmission power. Thus, the WTRU is able to reduce batter consumption by decreasing transmission power during the bundling window.

The WTRU may receive and accumulate TPC or TA command during the bundling window. The WTRU may not apply received TPC or TA commands during the bundling window since application of TPC or TA during DMRS bundling may disrupt phase continuity and/or power consistency maintained by the WTRU.

The WTRU may determine to apply the accumulated TA or TPC at the next available configured bundling window.

Alternatively, the WTRU may determine to apply accumulated TA or TPC at the next available sub-window if the WTRU receives TPC and TA commands during a sub-window. The WTRU may receive TA or TPC command(s) in PDCCH(s) or PDSCH(s). Reception of the PDCCH(s) or PDSCH(s) during the configured bundling window may disrupt phase continuity and/or power consistency. The WTRU may determine to create multiple sub-windows after receiving PDCCH(s) or PDSCH(s) and apply accumulated receive TA or TPC command(s) at the next available configured bundling window or sub-window.

Figure 11:
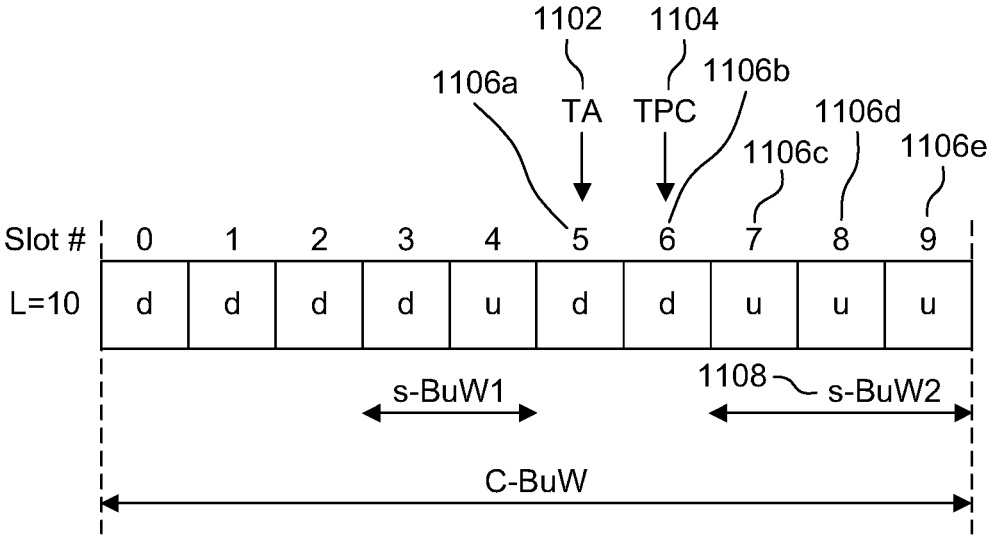
FIG. 11 is a diagram illustrating an example of the reception of TA and TPC during the configured bundling window.

FIG. 11 illustrates an example of the reception of TA and TPC during the configured bundling window. For example, as illustrated in FIG. 11, the WTRU may receive TA 1102 and TPC 1104 command from the gNB in slot #5 1106a and slot #6 1106b, respectively. The WTRU may receive the commands in PDSCH or PDCCH. The WTRU determines to split the configured time window into multiple sub-windows based on reception of DL channels in slot #5 1106a and slot #6 1106b. The WTRU may accumulate TA 1102 or TPC 1104 commands and apply them to PUSCH(s) in slot #7 1106c, slot #8 1106d, and slot #9 1106e in the sub-bundling window #2 1108.

The WTRU may receive an explicit indication to accumulate TA and/or TPC commands during a window and apply the accumulated command at the next s-BuW or C-BuW. If the WTRU does not receive the indication, the WTRU may determine to apply the received TPC command at the next C-BuW. The WTRU may determine to apply the accumulated command at the next C-BuW if type B repetition is configured.

Figure 12:
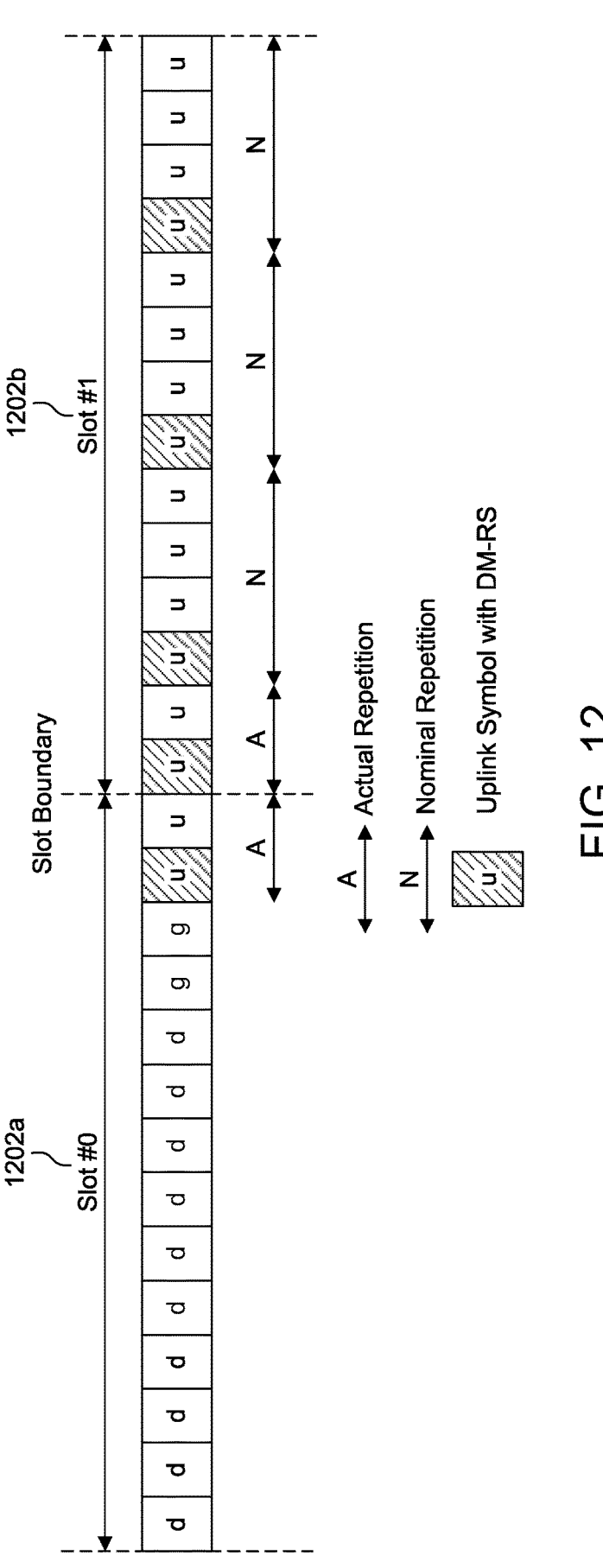
FIG. 12 is a diagram illustrating an example of repetition type B.

FIG. 12 is an example of type B repetition. FIG. 12, shows two slots, slot 1202a and slot 1202b with downlink symbols, guard symbols and uplink symbols (indicated by "d", "g" and "u", respectively). Type B repetition consists of actual repetitions and nominal repetitions where actual repetitions are generated when a nominal repetition crosses a slot boundary or consecutive uplink symbols are interrupted by downlink symbols. Uplink symbols containing DMRS is indicated by shaded boxes in the figure.

Figure 13:
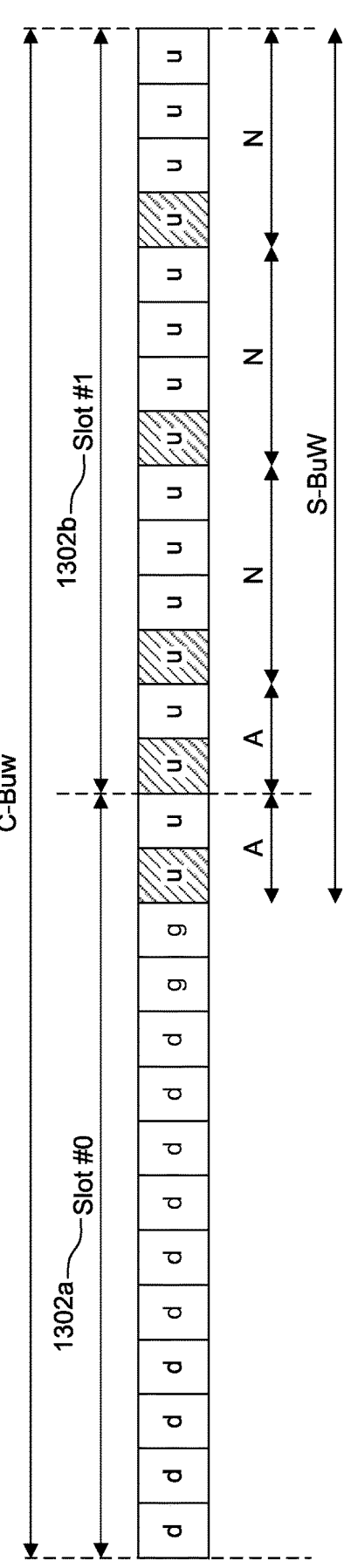
FIG. 13 is a diagram illustrating an example of a configured bundling window and sub-window.

FIG. 13 illustrates an example of a configured bundling window and generation of a sub-window. In FIG. 13, the WTRU may receive a configuration for a configured bundling window which spans two consecutive slots slot #0 1302a and slot #1 1302b(L=16 symbols). The WTRU may implicitly determines to configure a sub-window which starts at the second last uplink symbol in slot #0 1302a (12th symbol in slot #0) and ends at the 14th symbol in Slot #1. During the sub-window, the WTRU maintains phase continuity and/or power consistency such that the gNB may perform joint channel estimation using DMRS in the sub-window.

The WTRU may receive an indication to cancel transmission of an uplink symbol or uplink symbol(s), or receive an event which disrupts phase continuity and/or power consistency. The event which disrupts phase continuity and/or power consistency may be any of the aforementioned events.

In such a case, the WTRU may implicitly determine to generate one or more sub-windows. The WTRU may determine to stop the sub-window at the last symbol of actual/nominal repetition prior to the event and start a new sub-window at the beginning of the next earliest actual or nominal repetition. The WTRU may determine that granularity of start or end position of a sub-window is based on type of repetitions (e.g., nominal repetition, actual repetition). The WTRU may receive an indication or configuration from the gNB whether the granularity is based on actual or nominal repetitions. For example, if the granularity is based on nominal repetition, the WTRU may start a new sub-window at the beginning of the earliest nominal repetition, but not the beginning of the earliest actual repetition.

Figure 14:
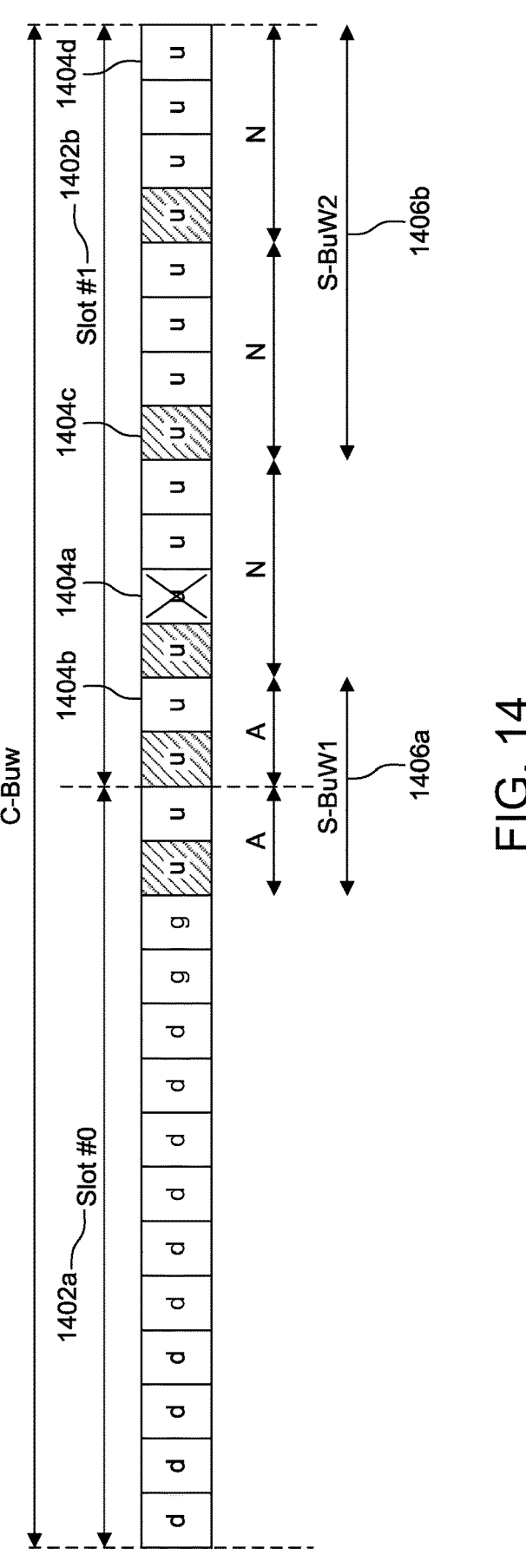
FIG. 14 is a diagram illustrating an example of a generation of sub-windows in a configured bundling window due to an phase/power disrupting event.

FIG. 14 illustrates an example of the generation of sub-windows in a configured bundling window due to a phase/power disrupting event. The bundling window may include Slot #0 1402a and Slot #1 1402b. As shown in FIG. 14, the WTRU receives an indication in DL symbols/slots to cancel uplink transmission at the 4th symbol 1404a in Slot #1 1402a. The WTRU may implicitly determine to stop the first sub-window, s-BuW1 1406a, at the 2nd symbol 1404b in Slot #1 1402a since the second symbols is at the end of actual repetition. Because the next earliest nominal or actual repetition starts at the 7th symbol 1404c in slot #1 1402b, the WTRU determines to start the second sub-window 1406b at the 7th symbol 1404c. Alternatively, WTRU may implicitly determine to stop a sub-widow at the last symbol 1404d prior to the event.

One potential advantage of the above embodiment is that the WTRU may maintain phase continuity and power at nominal/actual repetition basis such that joint channel estimation may be performed at repetition basis.

In another embodiment, the WTRU may receive configurations for type B repetitions from the gNB and TDD configurations (e.g., allocation of downlink and uplink symbols in slot(s)) via RRC. The WTRU may then receive a configuration for time domain window via RRC from the gNB If necessary, the WTRU may determine to split the configured time window into one or more sub-windows based on the TDD configuration. The WTRU may receive a cancellation indication of uplink symbols in the configured time window from the gNB prior to transmission of type B repetitions.

The WTRU may determine to start the first sub-window at the first symbol of type B repetition (e.g., the first uplink symbol in actual/nominal repetition) and end the first sub-window at the last actual/nominal repetition before the first uplink symbol which is canceled. The WTRU may determine to start the second sub-window at the first symbol of the earliest actual/nominal repetition after the last uplink symbol(s) that are canceled and ends the second window at the last symbol in the configured bundling window. The WTRU may maintain phase continuity and power consistency within a sub-window and transmits PUSCH. Once the WTRU completes the last PUSCH transmission in a sub-window, the WTRU may terminate its maintenance of phase continuity and power consistency.

Events that disrupt phase continuity and/or power consistency may occur more than once during the configured bundling window. In that case, at each event, the WTRU may determine to stop the sub-window and start a new sub-window based.

Alternatively, if the WTRU receives an event which disrupts phase continuity and/or power consistency, the WTRU may implicitly determine to generate one or more sub-windows and stop a sub-widow at the last symbol prior to the event and start a new sub-window at the next earliest uplink symbol. Thus, the WTRU may determine that granularity of start or end position of a sub-window is based on symbols.

Figure 15:
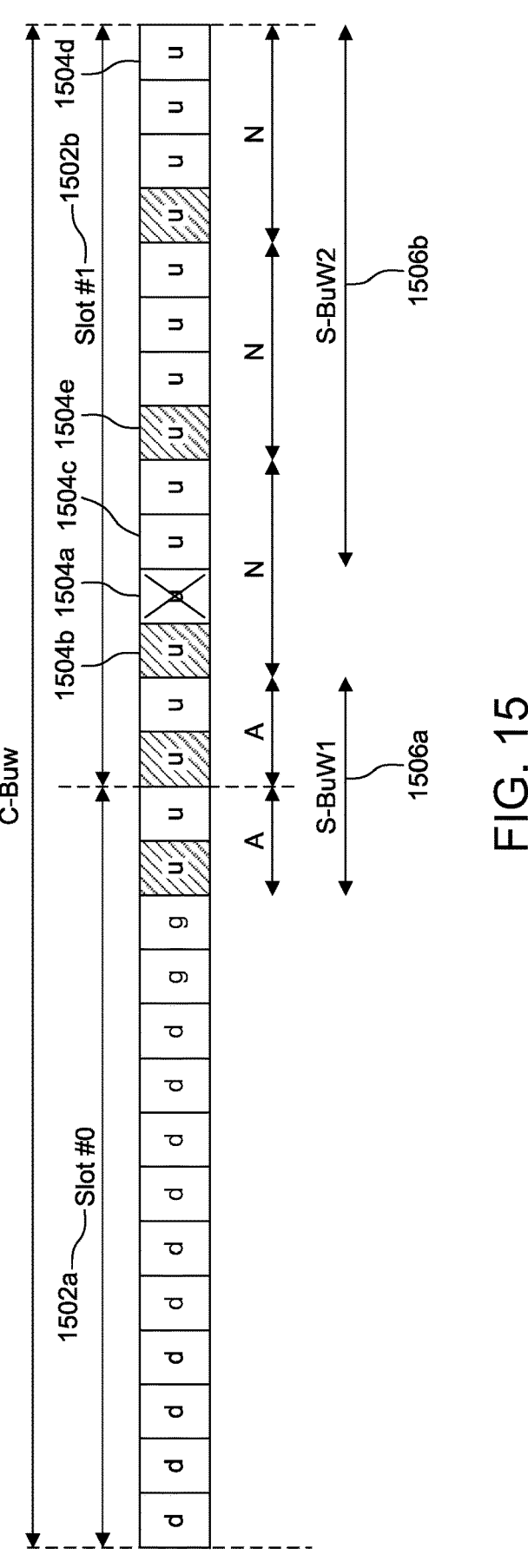
FIG. 15 is a diagram illustrating an example of a generation of sub-windows in a configured bundling window due to an phase/power disrupting event.

FIG. 15 illustrates an example of the generation of sub-windows in a configured bundling window due to a phase/power disrupting event. The bundling window may include Slot #0 1502a and Slot #1 1502b. As shown in FIG. 15, the WTRU receives an indication in DL symbols/slots to cancel uplink transmission at the 4th symbol 1504a in Slot #1 1502b. In such a case, the WTRU may implicitly determine to stop the first sub-window, s-BuW1 1506a, at the 3rd symbol 1504b in Slot #1 1502b. Then the WTRU implicitly determines to start the uplink at the 5th symbol 1504c in Slot #1 1502b and stops the window at the 14th symbol 1504d in Slot #1 1502b. Alternatively, WTRU may implicitly determine to stop a sub-widow at the last symbol of the actual/nominal repetition prior to the event.

In another example, the WTRU may start a new sub-window at the earliest DMRS symbol after the event. For example, in the example illustrated in FIG. 15, the WTRU may start the second sub-window, s-BuW2 1506b, at the 7th symbol 1504e where a DMRS is located.

The WTRU may receive a configuration from the gNB via RRC, MAC-CE or DCI or implicitly determine the number of guard symbols needed to initiate the sub-window. For example, the WTRU may receive DCI as during the event which disrupts phase continuity or power consistency, indicating how many guard symbols the WTRU should wait to start a new sub-window after the last occasion of the event. In another example, the WTRU may implicitly determine the number of the guard symbols the WTRU needs to wait before starting a new sub-window based on at least one of the following: (1) MCS; (2) bandwidth (e.g., the number of RBs); (3) number of grants over which joint channel estimation is performed; (4) number of TBs used to generate repetitions; (5) duration the WTRU maintained phase continuity and/or power consistency prior to the event; and/or (6) number of ports used for PUSCH transmission.

For example, the WTRU may determine to wait to transmit NG symbol(s) to initiate a new sub-window. An example of NG=1 is shown in FIG. 16 where the WTRU receives an indication in DL symbols/slots to cancel uplink transmission at the 4th symbol in Slot #1.

Figure 16:
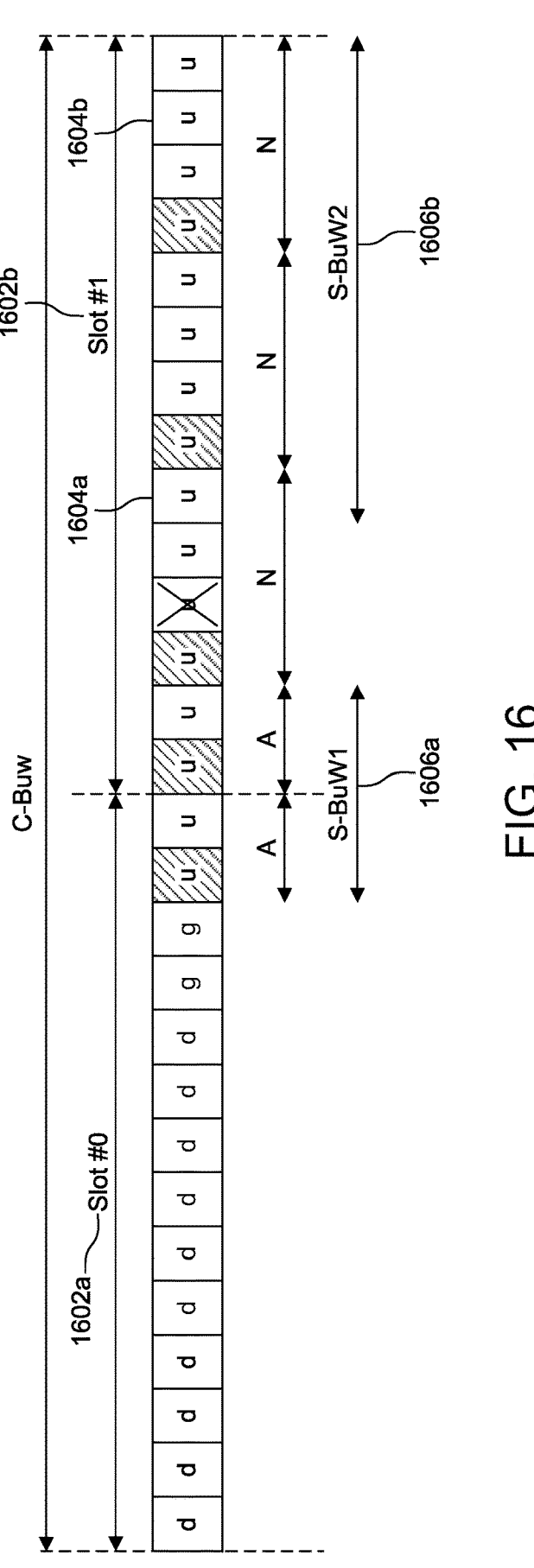
FIG. 16 is a diagram illustrating an example of a generation of sub-windows in a configured bundling window due to an phase/power disrupting event with one guard symbol.

As shown in FIG. 16, the WTRU may start a new sub-window, s-BuW2 1606b, at the 6th symbol 1604a in slot #1 1602b to allow the WTRU to prepare for phase continuity or power consistency maintenance. If by skipping NG, the WTRU reaches the last symbol in the configured bundling window or the end of the configured bundling window (e.g., NG=2 and a phase disrupting event occurs at the 13th symbol in Slot #1), the WTRU may determine to terminate DMRS bundling, i.e., stops maintenance of power consistency and phase continuity.

In another example, the WTRU may determine that NG=0 as the default value which is configured by the gNB.

One benefit of the above described method is that the WTRU may maintain phase continuity and power consistency across symbols that are not affected by the event. Accordingly, the gNB may apply channel estimate obtained from joint channel estimation to the symbols. In another example, the WTRU may receive a configuration from the gNB via RRC/MAC-CE/DCI regarding granularity of starting/end position of a sub-window.

Figure 17:
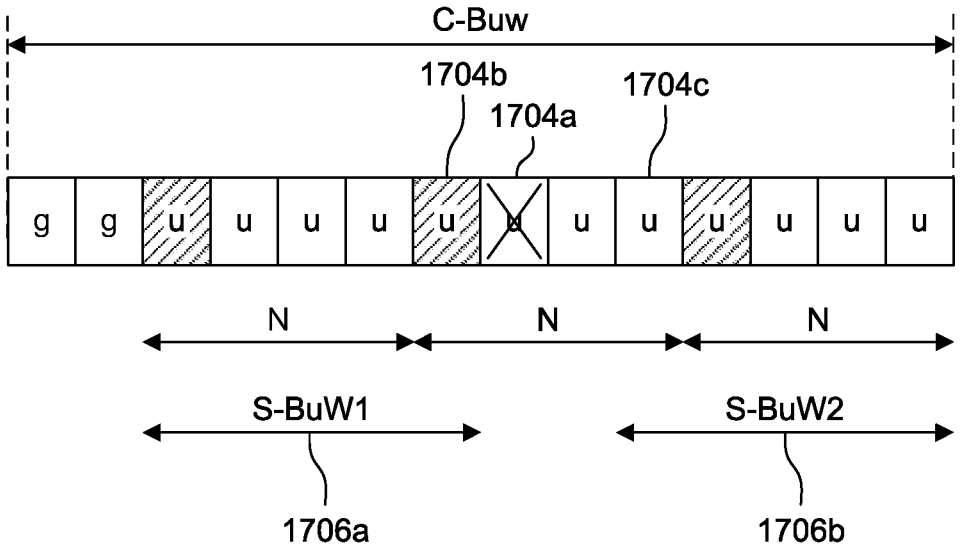
FIG. 17 is a diagram illustrating an example of an application of sub-windows to type B repetitions in a slot, NG=1.

The above described embodiments be applied to Type B repetition in a slot. FIG. 17 illustrates an exemplary application of sub-windows to Type B repetitions in a slot where NG=1. In the example illustrated in FIG. 17, the WTRU may receive an indication from the gNB that the 8th symbol 1704a in the slot is canceled. In such a case, if NG=1, the WTRU may stop the first sub-window 1706a at the 7th symbol 1704b and start the second sub-window at the 10th symbol 1704c in the slot and ends the second window at the last symbol in the configured bundling window.

The WTRU may determine to terminate DMRS bundling (e.g., maintenance of phase continuity and power consistency) after the event which disrupts power consistency and/or phase continuity depending on WTRU capability. For example, in the example shown in FIG. 16, the WTRU may determine to maintain phase and power continuity up until the 3rd symbol in Slot #1 or $2^{nd}$ symbol in Slot #1 and do not generate sub-windows after the canceled uplink symbol at the 4th symbol. Similar, in the example shown in FIG. 14, the WTRU may determine to maintain power consistency and power continuity until the second uplink symbol in slot #1 and do not generate sub-windows after the canceled uplink symbol at the 4th symbol.

Figure 18:
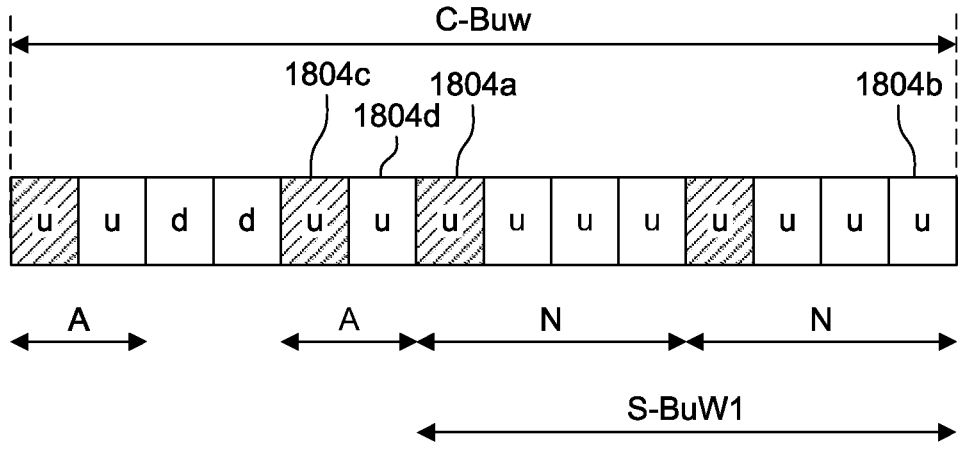
FIG. 18 is a diagram illustrates an example of when the WTRU determines to start the first sub-window at the beginning of a nominal repetition.

FIG. 18 illustrates an example of when the WTRU determines to start the first sub-window at the beginning of a nominal repetition. As shown in FIG. 18, the WTRU may determine to start the first sub-window in the configured bundling window at the beginning of the first nominal repetition where the first nominal repetition is among consecutive nominal and/or actual repetitions.

In FIG. 18, the WTRU implicitly determines to start the sub-window at the $7^{th}$ symbol 1804b in the slot and ends at the $14^{th}$ symbol 1804b in a slot (i.e., last symbol in the configured bundling window). The WTRU may include actual repetitions in a sub-window only if all associated actual repetitions may be included in the sub-window. For example, the WTRU determines not to include the second actual window ($5^{th}$ symbol 1804c and $6^{th}$ symbol 1804d in a slot) since the first actual repetition ($1^{st}$ and $2^{nd}$ uplink symbol) cannot be included in the sub-window due to two downlink symbols interrupting phase continuity and power consistency at the WTRU. Since the actual repetition contains part of a nominal repetition, bundling DMRS among consecutive nominal repetitions may be beneficial from the performance perspective.

Alternatively, the WTRU may determine to start the first sub-window in the configured bundling window at the beginning of the first actual repetition where the first actual repetition is among consecutive nominal and/or actual repetitions.

Figure 19:
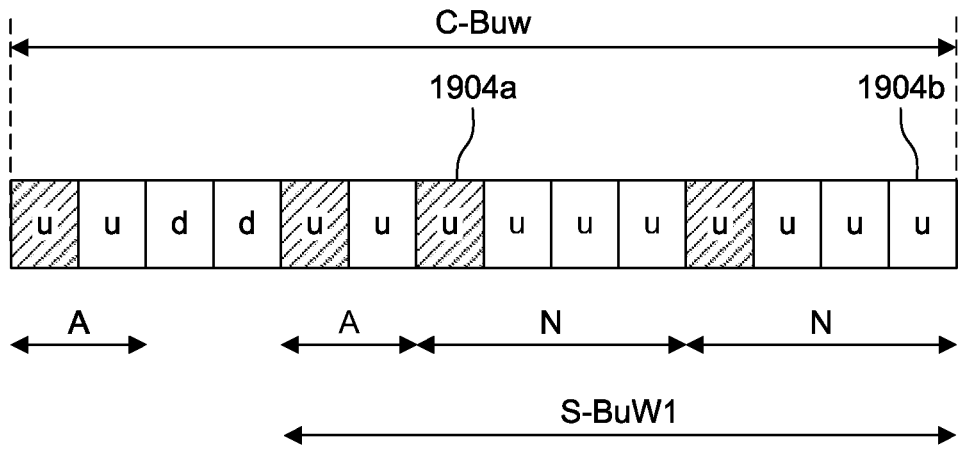
FIG. 19 is a diagram illustrates an example of when the WTRU determines to start the first sub-window at the beginning of an actual repetition.

FIG. 19 illustrates an example when the WTRU determines to start the first sub-window at the beginning of an actual repetition. As shown in FIG. 19, the WTRU implicitly determines to start the sub-window at the $5^{th}$ symbol 1904a in the slot and ends at the $14^{th}$ symbol 1904b in a slot (i.e., last symbol in the configured bundling window).

The WTRU may receive a configuration from the gNB via RRC/MAC-CE/DCI which mode (i.e., whether to include incomplete actual repetition in a sub-window or not) the WTRU should follow.

If the WTRU is not configured with the duration of C-BuW by the network, the WTRU may determine to use the default value. The WTRU may be preconfigured with the default value. The WTRU may determine the default value may be at least one of the following: (1) duration of configured repetitions (e.g., type A repetitions, type B repetitions) where the duration may include known and/or potential resources and/or (2) maximum duration over which the WTRU is capable of maintaining power consistency and/or phase continuity.

The WTRU may be configured with a frequency hopping pattern from the network. The WTRU may determine that each hop is an event that breaks power continuity and/or power consistency. Thus, the WTRU may determine the configured window, e.g., C-BuW, based on the duration of frequency hopping. The WTRU may associate each hop with a sub-window, e.g., s-BuW. If a phase continuity/power consistency breaking event occurs during a sub-window, the WTRU may determine to stop phase continuity/power consistency before the event and restart another sub window.

The WTRU may transmit a TB over multiple slots (TBoMS), either on a dynamic grant or a configured grant. The number of slots may be indicated by the gNB (e.g. part of DCI signaling) or configured by higher layers. The dynamic signaling may be for an allocated/specific grant or may be a modification for a configured value for the number of slots. The signaling may apply to a given HARQ process, TB, grant type, and/or grant. The WTRU may transmit the TB over consecutive slots (e.g. on available uplink slots in FDD UL carrier when interruptions are avoided). The WTRU may transmit the TB over non-consecutive UL slots (e.g. on available uplink slots in TDD carrier with DL interruptions, due to interruptions due to UL cancellation indication, or due to interruptions caused by bwp switching).

For transmission over non-consecutive slots, the WTRU may transmit the TBoMS in segments or over multiple non continuous transmissions. The WTRU may be configured with a "template segment", whereby the template segment is configured with a minimal number of slots, a maximum number of slots and/or PRBs. The WTRU may split the TBoMS over a number of segments, whereby each segment may contain at least a number of bits, a number of slots, and/or a number of PRBs within the limits defined by the template segment, or matching the template segment. The WTRU may create a new segment upon encountering a frame boundary, a DL slot, bwp switching, carrier de-activation, and/or an interruption from the network (e.g. a cancellation indication or indication of flexible slot as a DL slot). The WTRU may create a new TBoMS segment for transmission over a resource from the secondary set (e.g. a potential resource).

The template segment may be configured with a specific TDRA/TBS combination. The template segment and the number of slots may indicate to the WTRU the number of symbols over which the PUSCH is transmitted. The WTRU transmission of a TBoMS segment may not interrupted by DL symbols or a frame boundary. if a TBoMS segment is interrupted by a DL symbol, a frame boundary, and/or a cancellation indication, the WTRU may consider the UL transmission as another segment. A transmitted TBoMS segment may therefore be smaller in size (in terms of bits, slots, or PRBs) than the template segment. A transmitted segment may be larger than the template segment (e.g. if the number of consecutive slots allow it), though it may not be larger than the total TB size. A TBoMS segment may be a repetition of a previously transmitted segment.

Upon encountering a flexible TDD slot indicated as UL (e.g., potential resource), possibly after transmission of a TBoMS segment, the WTRU may create a new segment. The new segment may contain new data, possibly if the slot is a "known" resource (e.g., deterministically known at the gNB as an available UL slot), and the WTRU may indicate in a multiplexed UCI the segment indication and/or the associated HARQ process/TB. The new segment may contain content of previously transmitted segments, e.g. if the slot is a "potential" resource (e.g., not deterministically determined as an available UL slot such as a flexible TDD slot indicated as an UL slot by SFI, whereby the DCI indication is susceptible to DCI misdetection). For example, the content of the segment in a non-deterministic/dynamically indicated additional UL slot may be a copy of the one of the content previously transmitted in one of the previous slots of the previous segments of the TBoMS (e.g. the first slot, the last slot, or a predetermined slot).

The WTRU may transmit a new data in a TBoMS segment possibly on "known" resources/uplink slots (e.g. slots semi-statically configured as uplink slots). The WTRU may transmit copies of previously transmitted data in the same TBoMS in a "potential" resource/uplink slot (e.g. a flexible TDD slot that is dynamically indicated as an uplink slot). For example, the WTRU may repeat the previous slot if a slot is dynamically indicated to be available. The gNB may indicate to the WTRU the part of the previously transmitted TBoMS to copy in a dynamic uplink slot. For example, the gNB may signal in the DCI/SFI the previous slot and/or the previous segment to be copied over the indicated dynamic uplink slot(s). In one example, the WTRU may transmit a TBoMS in segments over a number of PUSCH or CG occasions. CG occasions may be continuous or non-continuous in the time domain.

The WTRU may continue to transmit segments until the full TB size is transmitted over multiple slots. The WTRU may indicate to the gNB (e.g. in a multiplexed UCI or MAC CE) that this is the last segment transmitted for a TBoMS. In another example, the WTRU may split the TB over multiple slots into segments such that the timing of the last segment is deterministic by both the WTRU and the gNB. For example, the WTRU may transmit the last segment on the last available UL slot in set of consecutive uplink slots. The WTRU may adapt the number of bits in a segment according to the TBS of the grant available in the slot(s) over which the segment is transmitted. The WTRU may receive a dynamic grant which spans multiple slots, a subset of which may be DL slots, flexible slots, and/or full duplex slots. The WTRU may skip, postpone, and/or segment the transmission of a TBoMS segment upon encountering a slot that may be used to continue the transmission of a TBoMS.

The WTRU may rate match or truncate the size/number of coded bits of the actual segment transmitted to fit the size of the gran in the slot(s) over which the segment is transmitted. For example, upon cancellation or dropping of an uplink slot over which a TBoMS segment is transmitted, the WTRU may rate match or truncate the TBoMS segment to match the TBS according to the reduced time-domain length (the reduced number of uplink slots).

The WTRU may retransmit a TBoMS segment in a dynamically indicated UL slot, and/or a flexible slot. For example, the WTRU may retransmit the TBoMS segment that was transmitted in a potential resource (e.g. a slot indicated by the DCI/SFI indicating the dynamic flexible slot as uplink).

The WTRU may postpone the transmission of TBoMS segment or segment a TBoMS upon encountering a DL slot, a UL slot cancellation (e.g. a cancellation indication), an LBT failure, a BWP switching indication, and/or a frame or a slot boundary.

There is may be a need for specific rules relating power control parameters when a slot is indicated as available dynamically, or the slot is a "potential" resource, while repetition bundling is on-going. Further when DMRS bundling is enabled there is also a need for rules relating to power control parameters since the power and phase continuity across bundled slots is needed for a coherent channel estimation process. Accordingly, rules for selecting, applying, and using power control parameters under different conditions are proposed herein.

In single cell configurations, if the WTRU is in a single cell configuration, and DMRS bundling is not enabled, then the power control procedures may apply in the newly available slot (e.g., potential resource), as the base station receiver is performing a slot-by-slot channel estimation and reception.

If the WTRU is in a single cell configuration, and the DMRS bundling is enabled, but no PT-RS phase support is configured, then the WTRU may maintain the previously set of power control parameters to maintain the DMRS bundling coherence across bundle window.

If the WTRU is in a single cell configuration, and the DMRS bundling is enabled along with a PT-RS configuration for phase continuity support, the WTRU may follow the power control procedures, applying all the required open loop and closed loop parameters as PT-RS will help resolving any DMRS coherence at the base station receiver.

Another potential power control problem is related to carrier aggregation and certain dual connectivity scenarios where power limited scenarios leading to scaling in SCG (Secondary Cell Group) or MCG (Master Cell Group) had to be handled for the repetitions with DMRS bundling where power and phase continuity are a factor in successful transmission.

In some situations, a symbol in one carrier may overlap with transmissions in other cells. In this situation, for power limited scenarios a power scaling/dropping is required and for this priority rules between physical channels are required:

If a PUCCH repetition with DMRS bundling enabled is ongoing in one carrier and into another carrier a PUSCH with the same priority index transmission opportunity is occurring, and overlapping, the WTRU may scale PUSCH to protect the phase continuity of the DMRS bundle.

Alternatively, if a PUCCH repetition with DMRS bundling and PT-RS configured for phase continuity correction is ongoing and overlaps with a PUSCH transmission with the same index priority, in a power limited scenario, the PUCCH repetition may be scaled.

If RACH on Pcell, overlap with at least a symbol or part of a symbol in different carrier of a PUCCH or PUSCH with UCI repetition in another carrier while DMRS bundling is enabled, and the WTRU is in power limited scenario, the WTRU may drop the PUCCH or PUSCH slot instead of scaling it as the phase continuity for DMRS cannot be maintained.

Alternatively, if RACH on Pcell, overlap with at least a symbol or part of a symbol in different carrier of a PUCCH or PUSCH with UCI repetition in another carrier while DMRS bundling is enabled, and the PT-RS is configured, and the WTRU is in power limited scenario, the WTRU may scale the PUCCH or PUSCH as the phase continuity for DMRS may be resolved through PT-RS presence.

For the EN-DC case, when the WTRU indicates dynamic sharing between E-UTRA and NR, and $$\hat{P}_{MCG}(i_1) + \hat{P}_{SCG}(i_2) > \hat{P}_{Total}^{EN\text{-}DC},$$

if a portion of the NR slot of the SCG is overlapping with a portion of MSG transmission that is part of a repetition when: (1) DMRS bundling is configured along with the repetition in SCG cell, then instead of scaling the SCG NR slot, the WTRU may drop the slot. If the power limitation of the NR SCG leg persist until the end of the bundle, the WTRU may signal the power scaling situation by triggering an power headroom report (alternatively, the WTRU may fall back to a second repetition configuration without the DMRS bundling that allows for SCG scaling slot by slot) and/or (2) when DMRS bundling is enabled, along with a PT-RS configuration in the SCG NR cell, the WTRU may use the SCG scaling due to phase continuity resolve that may be provided by PT-RS presence.

For the NE-DC case, when the WTRU indicates dynamic sharing between E-UTRA and NR, and $$\hat{P}_{MCG}(i_1) + \hat{P}_{SCG}(i_2) > \hat{P}_{Total}^{EN\text{-}DC},$$

if a portion of the NR slot of the MCG is overlapping with a portion of SGG transmission that is part of a repetition when: (1) the DMRS bundling is configured along with the repetition in MCG cell, then instead of scaling the MCG NR slot, the WTRU may drop the slot. If the power limitation of the NR MCG leg persist until the end of the bundle, the WTRU may signal the power scaling situation by triggering an power headroom report (alternatively, the WTRU may fall back to a second repetition configuration without the DMRS bundling that allows for MCG scaling slot by slot); and/or (2) when DMRS bundling is enabled, along with a PT-RS configuration in the MCG NR cell, the WTRU may use the a MCG scaling due to phase continuity resolve that may be provided by PT-RS presence.

A transport block may be transmitted using multiple slots, where each slot carries a segment of the transport block (TB). Such technique is called TB over multiple slots (TBoMS). A WTRU may be configured to repeat TBoMS using multiple transmission occasions. For example, a TBoMS allocated over 4 slots and with 3 repetitions will result on using 12 slots for TBoMS and its repetitions. In the following, we denote by N the number of allocated slots for a single TBoMS transmission and M the number of repetitions of TBoMS transmission. The total number of slots allocated for TBoMS and its repetitions is equal to N×M In some solutions, a WTRU may be configured semi-statically with the number of TBoMS repetitions (i.e., the WTRU may be configured semi-statically with the value of M). The WTRU then uses the configured number of repetitions upon receiving a TBoMS grant from the gNB with repetition enabled. In another embodiment, a WTRU may be configured semi-statically (e.g., using RRC signaling) with multiple values of number of repetitions and the WTRU dynamically determines the number of repetitions for TBoMS grant. For example, a bitfield in the DCI scheduling TBoMS may indicate the number of repetitions for TBoMS from the pre-configured number of repetitions. In another embodiment, the WTRU may determine the number of TBoMS repetitions using the indicated time domain resource allocation (TDRA) row. For example, the WTRU may be configured semi-statically with a TDRA table for TBoMS that have multiple rows (each row of the table indicate the number of allocated slots for TBoMS) and the scheduling DCI will indicate one of the rows. The TDRA table for TBoMS may have a column indicating the number of repetitions for TBoMS.

In one embodiment, a WTRU may be configured to determine the number of repetition M based on the number of allocated slots N for a single TBoMS transmission. The WTRU may determine the number N dynamically using a bitfield in the DCI scheduling TBoMS. In one example embodiment, the set of M for the WTRU to select from depends on the indicated N for TBoMS. The set of semi-statically configured values of M may be grouped into subset and each subset is associated with a value of N. For example, the WTRU is pre-configured with the set {M1, M2, M3, M4} of number of repetitions and pre-configured with two values of the number of slots N1 and N2 per a single TBoMS transmission. The subset {M1, M2} is associated with N1, and the subset {M3, M4} is associated with N2. When the WTRU receives a TBoMS grant indicating N1 slots per single TBoMS transmission, the WTRU selects the number of repetitions from the subset {M1, M2}. For example, in case one bit in the DCI indicates the number of repetitions, the value 0 corresponds to M1 and value of 1 corresponds to M2. When the WTRU receives a TBoMS grant indicating N2 slots per single TBoMS transmission, the WTRU selects the number of repetitions from the subset {M3, M4}. For example, in case one bit in the DCI indicates the number of repetitions, the value 0 corresponds to M3 and value of 1 corresponds to M4.

The WTRU may be configured to determine the number of repetition M based on one or a combination of the following: (1) the number of allocated slots N for a single TBoMS transmission; (2) the indicated transport block size (TBS) for TBoMS. For example, based on the indicated TBS value, the WTRU determines the number of TBoMS repetitions (i.e., value of M). In one example, the WTRU may be configured with a mapping/association between TBS values and M values; (3) the scheduled MCS value and/or configured MCS table for TBoMS transmission. For example, based on the indicated MCS value, the WTRU determines the number of TBoMS repetitions. The WTRU may be configured with a mapping/association between MCS values/table and M values.

In some embodiment, a WTRU may be configured to receive an indication of the M×N value (e.g., in the DCI). For example, the WTRU may determine the M×N value from the received TDRA configuration for a TBoMS grant. The WTRU may then determine the value of M and N based on the received TDD configuration. In one example embodiment, the WTRU may select N that is equal to the shortest number of consecutive UL slots of the TDD configuration. In another example, the WTRU may select N that is equal to the longest number of consecutive UL slots. The WTRU uses the consecutive UL slots to transmit a single TBoMS transmission and repeat TBoMS transmission using the set of consecutive slots UL slots M time. For example, a WTRU receives an indication of M×N=16 for a TBoMS grant. From the TDD configuration, the WTRU determines that number of shortest consecutive UL slots is equal to 2. The WTRU uses N=2 for a single TBoMS transmission and M=8 repetitions. Such embodiment may be used under some conditions (for example, when the joint channel estimation is enabled). For example, the WTRU may receive a configuration for a bundling window with duration M×N. As explained above, the WTRU may select shortest or longest number of consecutive UL slots from the TDRA configuration.

For UL configured grant (CG) transmission, a WTRU may determine the value of M based on the available resources during the CG period. When there are not enough resources available during a CG period, the WTRU does not repeat TBoMS transmission. For example, the WTRU may determine available slots for transmission of TBoMS repetitions first. Then, given N, the WTRU may determine value of M that may be achieved with number of available slots, i.e., if the number of available slots is K, the WTRU determines M such that M×N is less than or equal to K. If A WTRU may be configured to interleave different version of TBoMS repetitions. In one embodiment, using the first N slots allocated for TBoMS, the WTRU transmits part of the TBoMS and repeats it M times. Using the second N slots the WTRU again transmits and repeats part of the TBoMS M times. The WTRU repeats this procedure until it uses M×N slots.

Figure 20:
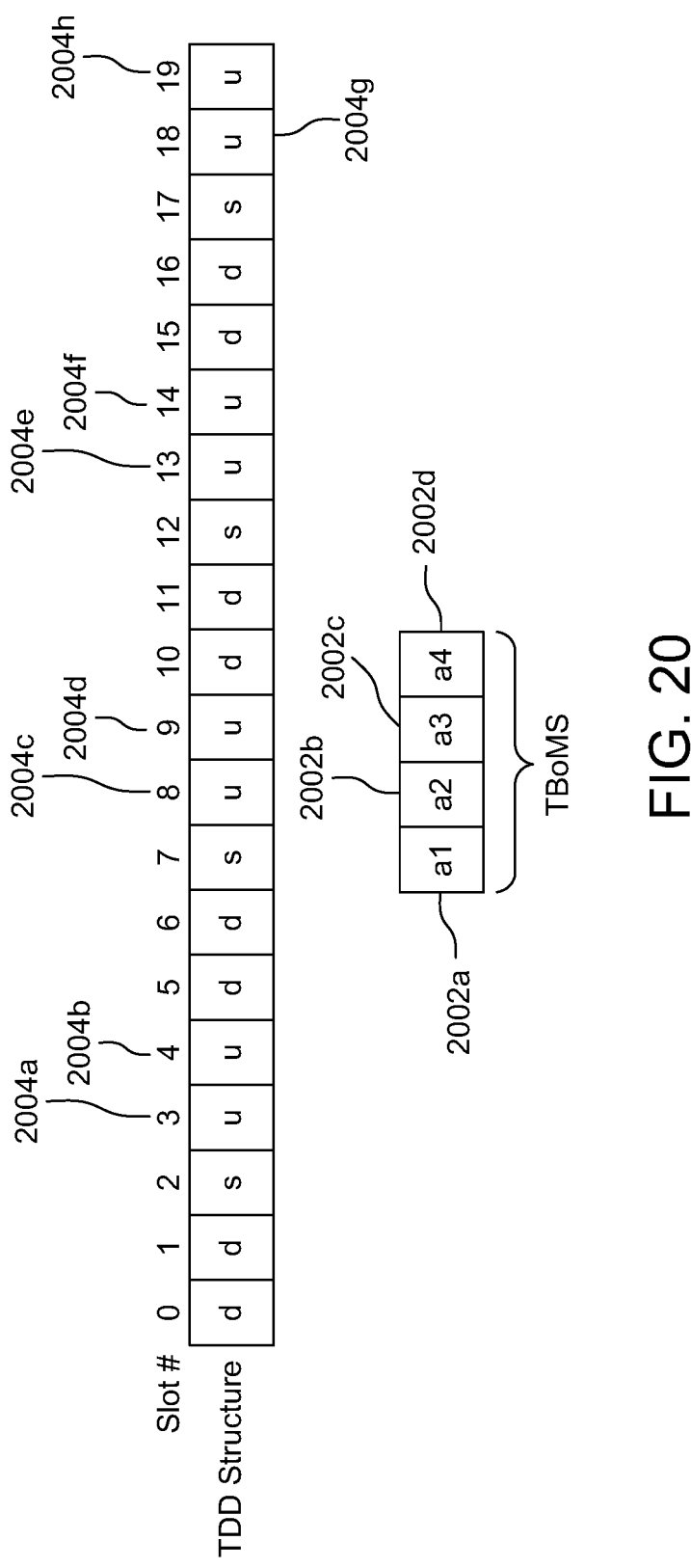
FIG. 20 is a diagram illustrating an example TBoMS and TDD structure.

FIG. 20 illustrates an example TBoMS and TDD structure. As illustrated in FIG. 20, the WTRU may receive a configuration for TBoMS over four slots, slot a1 2002a, slot a2 2002b, slot a3 2002c, and slot a4 2002d (i.e., N=4). A TDD structure is shown where uplink slots are located at slot number 3 2004a, slot number 4 2004b, slot number 8 2004c, slot number 9 2004d, slot number 13 2004e, slot number 14 2004f, slot number 18 2004g, and slot number 19 2004h. Downlink slots and special slots (e.g., a slot which contains downlink symbols, uplink symbols and/or guard symbols) are indicated by "d" and "s" respectively.

Figure 21:
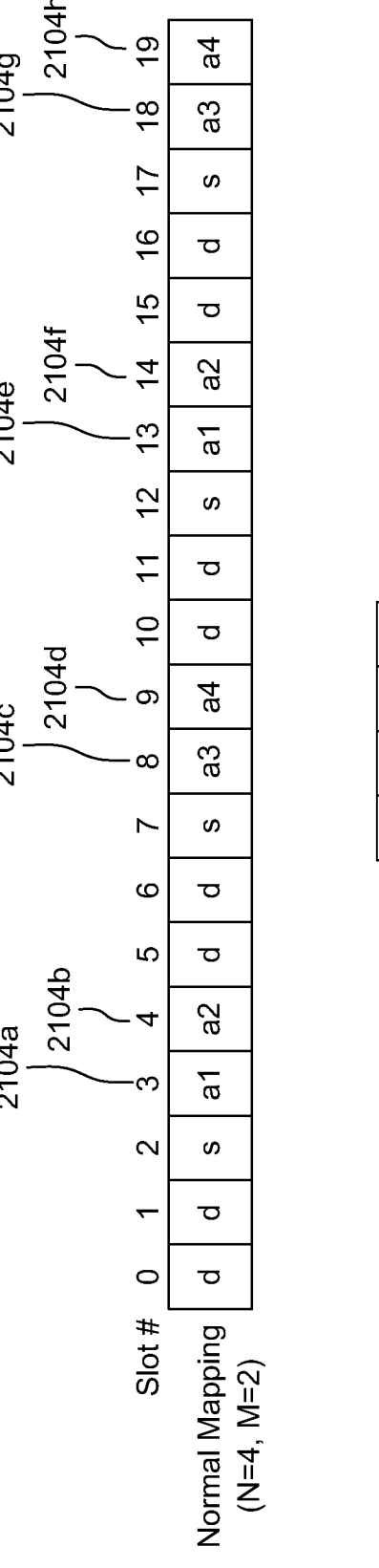
FIG. 21 is a diagram illustrating an example of a mapping of repetitions of TBoMS.
Figure 21:
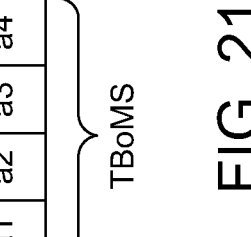

FIG. 21 illustrates an example of a mapping of repetitions of TBoMS. The WTRU may determine to apply a mapping of repetitions of TBoMS (M=2) as shown in FIG. 21 where the first repetition (e.g., first version) of TBoMS is mapped on slot number 3 2104a, slot number 4 2104b, slot number 8 2104c and slot number 9 2104d while the second repetition (e.g., second version) of TBoMS is mapped on slot number 13 2104e, slot number 14 2104f, slot number 18 2104g, and slot number 19 2104f. Alternatively the WTRU may determine to map repetitions of TBoMS in a configured pattern (e.g., interleaved pattern). The WTRU may receive such a pattern via RRC from the gNB.

Figure 22:
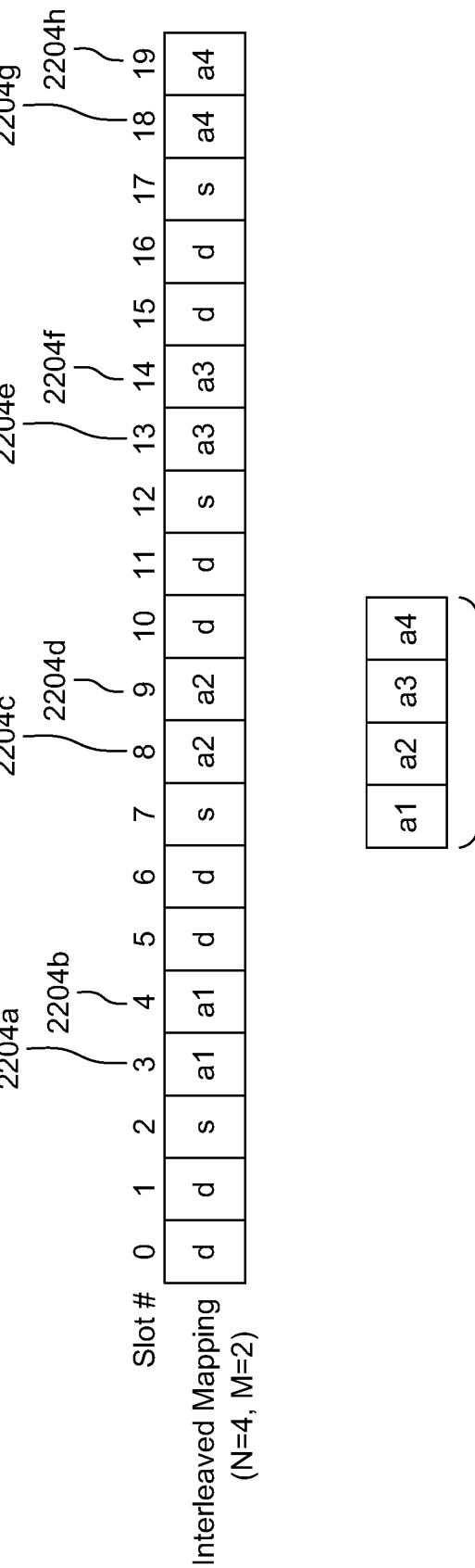
FIG. 22 is a diagram illustrating an example of interleaved mapping of repetitions of TBoMS.

An example of an interleaved pattern is shown in FIG. 22 where the WTRU transmits the first repetition of TBoMS in slot number 3 2204a, slot number 8 2204c, slot number 13 2204e and slot number 18 2204g. The WTRU transmits the second repetition of TBoMS in slot number 4 2204b, slot number 9 2204d, slot number 14 2204f and slot number 19 2204h.

The WTRU may determine to apply a mapping or interleaved mapping depending on at least one or combinations of the following conditions: (1) whether joint channel estimation or DMRS bundling is configured or not (e.g., the WTRU may apply a mapping when joint channel estimation is enabled. Otherwise, the WTRU applies interleaved mapping); (2) channel conditions (e.g., Doppler shift, Doppler spread, delay spread, number of paths in multipath channels); (3) WTRU mobility (e.g., how fast WTRU is moving); (4) RV sequence used for TBoMS.

In some embodiments a WTRU may be configured to use frequency hopping every N slots. A WTRU may be configured with multiple hopping patterns. The WTRU determines the hopping pattern based on the consecutive number of UL slots and the number N.

In some embodiments, a WTRU may be configured with multiple TCI states, each TCI state may be used in one of the TBoMS repetition. In one example, the WTRU may be indicated by the gNB which TCI state to use for a TBoMS repetition. In another example, a WTRU may be configured with a TCI pattern to apply for TBoMS and its repetitions.

In some embodiments, a WTRU may be configured semi-statically with RV sequence that may be used in the TBoMS and its repetitions. In another embodiment, the WTRU may be indicated dynamically by the gNB which RV sequence to use for a TBoMS repetition. In another embodiment, a WTRU may be configured to determine the RV sequence for TBoMS and its repetitions based on one or more of the following: (1) the number N of slots per TBoMS; (2) the number M of repetitions; (3) the TBS; (4) the MCS.

Figure 23:
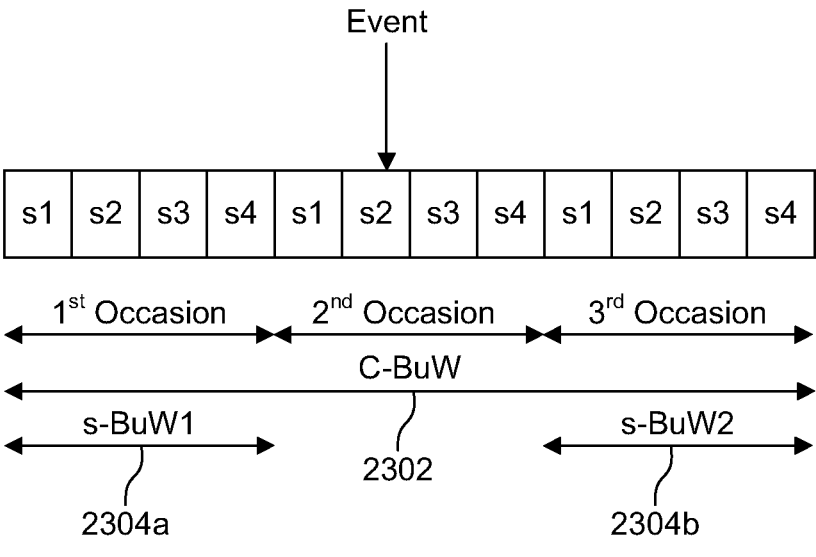
FIG. 23 is a diagram illustrating an example of DMRS bundling for TBoMS repetitions.

An example of TBoMS repetitions with N=4 (e.g., TBoMS is scheduled over 4 slots) and M=3 (e.g., the number of TBoMS repetitions is 3) is shown in FIG. 23 where s1, s2 s3 and s4 indicate slots over which one occasion of TBoMS is mapped.

The WTRU may be configured to perform DMRS bundling over TBoMS repetitions. As shown in FIG. 23, the WTRU may be configured with C-BuW 2302 over TBoMS repetitions. If an event which breaks phase continuity and/or power consistency (e.g., SFI, cancellation of transmission) occurs in the middle of repetitions, the WTRU may determine to generate sub time window (e.g., s-BUW1 2304a) up to and including the last slot of the TBoMS transmission occasion before the event. Thus the WTRU may determine to maintain phase continuity and/or power consistency up to and including the last slot of the TBoMS transmission occasion. For example, as illustrated in FIG. 23, the WTRU may determine to create a s-BuW1 2304a up to and including the slot indicated by "s4" in the 1st occasion of the TBoMS repetition.

If the WTRU is configured to restart the window, the WTRU may determine to start a new sub-window, e.g., "s-BuW2" in the figure, at the first symbol of the first slot of the earliest TBoMS transmission occasion after the event. The WTRU may determine to stop s-BuW2, e.g., stop maintenance of phase continuity and/or power consistency, at the end of s-BuW2 which is also the end of C-BuW, configured bundling window.

Figure 24:
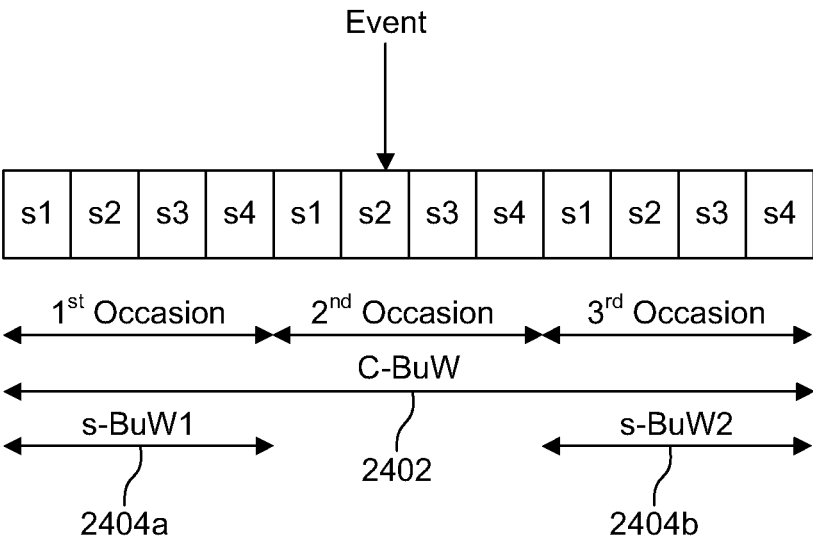
FIG. 24 is a diagram illustrating another example pf DMRS bundling for TBoMS repetitions.

In another example, as shown in FIG. 24, the WTRU may be configured with C-BuW 2402 over TBoMS repetitions. If an event which breaks phase continuity and/or power consistency (e.g., SFI, cancellation of transmission) occurs in the middle of repetitions, the WTRU may determine to generate sub time window (e.g., s-BUW1 2404a) up to and including the slot before the event. Thus the WTRU may determine to maintain phase continuity and/or power consistency up to and including the last slot that contains PUSCH associated with the TBoMS repetition (e.g., PUSCH occasion) before the event. For example, as illustrated in FIG. 24, the WTRU may determine to create a s-BuW1 2404a up to and including the slot indicated by "s2" in the 2$^{st}$ occasion of TBoMS repetition. If the WTRU is configured to restart the window, the WTRU may determine to start a new sub-window (e.g., "s-BuW2"2404b, at the first symbol of the first slot of the earliest slot after the event where the slot contains PUSCH associated with the TBoMS repetition. The WTRU may determine to stop s-BuW2, e.g., stop maintenance of phase continuity and/or power consistency, at the end of s-BuW2 which is also the end of C-BuW, configured bundling window.

The WTRU may determine whether to generate a sub-bundling window after the event based at the earliest PUSCH transmission occasion or TBoMS occasion based on an explicit indication/configuration from the gNB.

The WTRU may be configured to perform phase and/or power consistency maintenance for retransmitted TBoMS. The WTRU may determine to associate configurations related to joint channel estimation for the original transmission of TBoMS with retransmitted TBoMS. For example, the WTRU may determine to use the same duration for C-BuW for retransmitted TBoMS. The WTRU may also determine to the default value based on at least one of the following: (1) duration of configured repetitions (e.g., type A repetitions, type B repetitions) where the duration may include known and/or potential resources and/or (2) maximum duration over which the WTRU is capable of maintaining power consistency and/or phase continuity.

The WTRU may be configured with a validity condition for configuration for DMRS bundling. For example, if the retransmission of TBoMS is scheduled at later time than the expiration time (e.g., determined based on time offset since the last transmission of the canceled TBoMS), the WTRU may determine to request the network for new configuration for DMRS bundling.

In some embodiments, the WTRU may spread the TBoMS and its repetitions over multiple periods of an uplink configured grant (CG) when the available resources within a CG period is not sufficient for transmitting TBoMS and its repetitions. For example, a CG configuration includes 4 uplink slots within a CG period. In case the WTRU is configured with a TBoMS over two slots and 4 repetitions, the WTRU uses two CG periods to transmit the TBoMS and its repetitions. The WTRU may determine whether to use multiple CG periods for TBoMS and its repetitions based on the configured CG period. For example, the WTRU may be configured with CG period threshold. If the CG period is below the configured threshold, the WTRU may spread the TBoMS and its repetitions over multiple CG periods. In some embodiment, the WTRU may determine the value of M based on the available resources during CG period and the period of the CG. For example, the WTRU may determine that the CG period is above the configured threshold and thus spreading TBoMS and its repetitions over multiple periods of CG is not allowed. The WTRU may then determine M based on the available resources within one CG period only. In another example, the WTRU may determine that the CG period is below the configured threshold and thus may spread TBoMS and its repetitions over multiple periods of CG. The WTRU may then determine M based on the available resources within the selected CG period(s) for TBoMS transmission (e.g., two CG periods). The WTRU may be configured with a maximum number of CG periods that the WTRU may use for a TBoMS and its repetitions. The WTRU may be configured with a maximum duration that a TBoMS transmission and its repetitions should not exceed.

In one example, the WTRU may determine the number of repetitions for TBoMS based on the available resources within one CG period. Due to inconsistent assignment of uplink and downlink slots between CG periods, the WTRU may determine that the different number of uplink slots are available slot per CG period. For example, the WTRU may be configured to transmit M repetitions for TBoMS where one TBoMS occasion requires N slots, requiring N*M slots for the TBoMS repetitions. If the number of available resources (e.g., available uplink slots) within one CG period is not enough to transmit M repetitions of TBoMS, the WTRU may determine to transmit F actual repetitions where F<M and F*N is less than or equal to the number of available resources in one CG period. If the number of available resources in one CG period is less than N, the WTRU may not transmit TBoMS repetitions or TBoMS, or postpone or skip transmission of TBoMS repetitions. Alternatively, If the number of available resources in one CG period is less than N, the WTRU may determine to rate match TBoMS such that one occasion of TBoMS may be transmitted in the CG period. For each CG period, the WTRU may determine different or same F such that F*N is less than or equal to the number of available resources in a CG period. For example, if the WTRU is configured with N=2 and M=4 by the network (e.g., gNB), for one CG period, the WTRU may determine that 6 slots are available for UL transmission. The WTRU may determine to transmit F=3 repetitions such that N*F=6 and 3 TBoMS repetitions may be transmitted in the CG period. In the subsequent period, the WTRU may determine that 5 uplink slots are available. The WTRU may determine that F=2 such that N*F<5 and the WTRU transmits 2 repetitions of TBoMS.

In one example, if the WTRU determines F, the number of actual repetitions, based on the number of available resources in a CG period and F is greater than 1, and DMRS bundling (e.g., joint channel estimation) is enabled by the network, the WTRU may determine to map TBoMS using a mapping such as the mapping shown in FIG. 21. For example, if DMRS bundling is enabled, K=2 and N=4, and TBoMS mapped over 4 slots is represented as a1, a2, a3, a4, and 8 consecutive uplink slots are available, the WTRU may determine to map TBoMS repetitions such that a1, a2, a3, a4, a1, a2, a3, a4 are mapped to the 8 consecutive uplink slots, where the first set of a1, a2, a3, a4 is the first occasion of TBoMS repetition and the second set of a1, a2, a3, a4 is the second occasion of TBoMS repetition. In the example, the first set of a1, a2, a3, a4 (e.g., the first occasion of TBoMS repetition) is allocated to $1^{st}$, $2^{nd}$, $3^{rd}$ and $4^{th}$ slot of the 8 consecutive uplink slots and the second set of a1, a2, a3, a4 (e.g., the second occasion of TBoMS repetition) is allocated to $5^{th}$, $6^{th}$, $7^{th}$ and $8^{th}$ slot of the 8 consecutive slots. Using a mapping for TBoMS repetitions, channel effectively changes slowly during each occasion of TBoMS, improving performance of joint channel estimation for TBoMS repetitions.

In another example, if the WTRU determines F based on the number of available resources in a CG period and F is greater than 1, and DMRS bundling (e.g., joint channel estimation) is disabled, the WTRU may determine to allocate TBoMS repetitions using interleaved mapping such as the mapping scheme shown in FIG. 22. For example, if DMRS bundling is disabled by the network, K=2 and N=4, and TBoMS mapped over 4 slots is represented as a1, a2, a3, a4, and 8 consecutive uplink slots are available, the WTRU may determine to map TBoMS repetitions such that a1, a4, a2, a1, a3, a2, a4, a3 are mapped to the 8 consecutive uplink slots, where the first occasion of the TBoMS repetition is mapped onto the $1^{st}$, $3^{rd}$, $5^{th}$ and $7^{th}$ uplink slot and where the second occasion of the TBoMS repetition is mapped onto the $2^{nd}$, $4^{th}$, $6^{th}$ and $8^{th}$ uplink slot with an interleaved pattern. Using an interleaved mapping pattern, the decoding performance for TBoMS repetitions may be improved due to time diversity. If the number of available resources is less than in a CG period is less than N, the WTRU may determine to rate match TBoMS such that one occasion of TBoMS may be transmitted with the available resources in the CG period. For example, if M=4 and N=4, and 3 uplink slots are available in a CG period, the WTRU may determine M=1 and rate match TBoMS such that one TBoMS occasion may be transmitted in 3 uplink slots.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method performed by a wireless transmit/receive unit (WTRU), the method comprising:

receiving configured grant (CG) information that includes: a configured grant period, an indication of a number of slots for Transport Block over Multiple Slots (TBoMS), and an indication of demodulation reference signal (DMRS) bundling being disabled or enabled;

determining a TBoMS-segment mapping pattern based on the indication of DMRS bundling being disabled or enabled;

determining, for the CG period, a number of repetitions for a transport block (TB) based on available uplink (UL) slots in the CG period and the number of slots for TBoMS; and transmitting, in time division duplex (TDD), TBoMS segments of the TB according to the determined TBoMS-segment mapping pattern for each repetition of the determined number of repetitions, wherein the number of repetitions is greater than 1.

2. The method of claim 1, wherein the mapping pattern associated with DMRS being disabled is an interleaved pattern, wherein each TBoMS segment is interleaved with one or more other TB segments based on available uplink slots within the CG period.

3. The method of claim 1 further comprising: on condition that DMRS bundling is enabled, transmitting the TB with the determined number of repetitions, wherein the segments of the TB are transmitted sequentially for each repetition.

4. The method of claim 1, wherein the CG information further includes an indication to perform TBoMS repetitions.

5. The method of claim 1, wherein the CG information further includes an indication that DMRS bundling is disabled.

6. The method of claim 5, wherein DMRS bundling is disabled based on a disabling event occurring during the CG period.

7. The method of claim 6, wherein the disabling event includes using a slot format that includes non-consecutive slots for uplink transmissions.

8. A wireless transmit/receive unit (WTRU) comprising:

a transceiver; and a processor coupled to the transceiver;

wherein the transceiver and the processor are configured to:

receive configured grant (CG) information that includes:

a configured grant period, an indication of a number of slots for Transport Block over Multiple Slots (TBoMS), and an indication of demodulation reference signal (DMRS) bundling being disabled or enabled;

determine a TBoMS-segment mapping pattern based on the indication of DMRS bundling being disabled or enabled;

determine, for the CG period, a number of repetitions for a transport block (TB) based on available UL slots in the CG period and the number of slots for TBoMS;

on a condition that the number of repetitions is greater than 1, transmit, in a time division duplex (TDD), TBoMS segments of the TB according to the determined TBoMS-segment mapping pattern for each repetition of the determined number of repetitions; and on a condition that the number of repetitions is 1, transmit, in TDD, the TBoMS segments of the TB sequentially in consecutive UL slots equal to the indicated number of slots for TBoMS.

9. The WTRU of claim 8, wherein the mapping pattern associated with DMRS being disabled is an interleaved pattern, wherein each TBoMS segment is interleaved with one or more other TB segments based on available uplink slots within the CG period.

10. The WTRU of claim 8, wherein, on condition that DMRS bundling is enabled, the transceiver is configured to transmit the TB with the determined number of repetitions, wherein the segments of the TB are transmitted sequentially for each repetition.

11. The WTRU of claim 8, wherein the CG information further includes an indication to perform TBoMS repetitions.

12. The WTRU of claim 8, wherein the CG information further includes an indication that DMRS bundling is disabled.

13. The WTRU of claim 12, wherein DMRS bundling is disabled based on a disabling event occurring during the CG period.

14. The WTRU of claim 13, wherein the disabling event includes using a slot format that includes non-consecutive slots for uplink transmissions.

15. A wireless transmit/receive unit (WTRU), comprising:

a transceiver; and a processor coupled to the transceiver:

wherein the transceiver and the processor are configured to:

receive configured grant (CG) information that includes:

a configured grant period, an indication of a number of slots for Transport Block over Multiple Slots (TBoMS), and an indication of whether demodulation reference signal (DMRS) bundling is disabled or enabled;

determine a TBoMS-segment mapping pattern based on whether DMRS bundling is disabled or enabled, wherein, when DMRS bundling is disabled, the mapping pattern interleaves TBoMS segments across available uplink (UL) slots within the CG period, and wherein, when DMRS bundling is enabled, the TBoMS segments for each repetition are placed sequentially in a number of consecutive UL slots equal to the indicated number of slots for TBoMS;

determine, for the CG period, a repetition count for a transport block (TB) based on available UL slots in the CG period and the indicated number of slots for TBoMS, the repetition count being greater than 1; and transmit, in time division duplex (TDD), TBoMS segments of the TB according to the determined TBoMS-segment mapping pattern for each repetition of the repetition count based on the number of repetitions being greater than 1.

16. The WTRU of claim 15, wherein when DMRS bundling is disabled, the mapping pattern is an interleaved pattern across non-consecutive UL slots within the CG period.

17. The WTRU of claim 15, wherein the CG information further includes an indication to perform TBoMS repetitions.

* * * * *